United States Patent
Shao

(10) Patent No.: US 12,223,728 B2
(45) Date of Patent: Feb. 11, 2025

(54) METHOD AND APPARATUS FOR DETERMINING PICTURE SWITCHING, ELECTRONIC DEVICE, AND STORAGE MEDIUM

(71) Applicant: Hangzhou Hikvision Digital Technology Co., Ltd., Hangzhou (CN)

(72) Inventor: Zhenbang Shao, Hangzhou (CN)

(73) Assignee: HANGZHOU HIKVISION DIGITAL TECHNOLOGY CO., LTD., Hangzhou (CN)

( * ) Notice: Subject to any disclaimer, the term of this patent is extended or adjusted under 35 U.S.C. 154(b) by 169 days.

(21) Appl. No.: 17/995,166

(22) PCT Filed: Mar. 29, 2021

(86) PCT No.: PCT/CN2021/083576
§ 371 (c)(1),
(2) Date: Sep. 30, 2022

(87) PCT Pub. No.: WO2021/197259
PCT Pub. Date: Oct. 7, 2021

(65) Prior Publication Data
US 2023/0177838 A1 Jun. 8, 2023

(30) Foreign Application Priority Data
Mar. 30, 2020 (CN) .......... 202010239581.X

(51) Int. Cl.
*G06V 20/52* (2022.01)
*G06T 7/20* (2017.01)
*G06V 20/40* (2022.01)

(52) U.S. Cl.
CPC ............ *G06V 20/52* (2022.01); *G06T 7/20* (2013.01); *G06V 20/44* (2022.01); *G06T 2207/30232* (2013.01); *G06V 2201/07* (2022.01)

(58) Field of Classification Search
CPC .... G06V 20/52; G06V 20/44; G06V 2201/07; G06V 20/10; G06V 20/41; G06T 7/20;
(Continued)

(56) References Cited

U.S. PATENT DOCUMENTS 10,165,650 B1 * 12/2018 Fini .................. H05B 45/10
2007/0035627 A1 * 2/2007 Cleary ............ H04N 21/4223
348/E7.086
(Continued)

FOREIGN PATENT DOCUMENTS

| CN | 102065279 | 5/2011 |
| CN | 105530465 | 4/2016 |

(Continued)

OTHER PUBLICATIONS

International Search Report and Written Opinion issued in Corresponding PCT Application No. PCT/CN2021/083576, dated Jun. 22, 2021 (English Translation provided).

(Continued)

*Primary Examiner* — Jared Walker
(74) *Attorney, Agent, or Firm* — NORTON ROSE FULBRIGHT US LLP

(57) ABSTRACT

Provided in embodiments of the present application are a method and an apparatus for determining picture switching, an electronic device, and a storage medium. The method comprises: issuing tracking tasks for a target object to designated multiple monitoring devices; receiving detection events reported by the monitoring devices, wherein the detection events are event information reported by the (Continued)

monitoring devices based on presence statuses of the target object in acquired video pictures; and determining to perform cross-device tracking picture switching when a received detection event satisfies a preset condition for an object crossing an acquisition area; wherein, the object crossing the acquisition area means that the target object enters or leaves the acquisition area of one of the multiple monitoring devices. Compared with the prior art, applying the solution provided by the embodiments of the present application can reduce the integration difficulty of a management platform of a monitoring system.

20 Claims, 11 Drawing Sheets

(58) Field of Classification Search
CPC .... G06T 2207/30232; G08B 13/19608; G08B 13/19641; H04N 7/181; H04N 5/268; H04N 7/188
See application file for complete search history.

(56) References Cited

U.S. PATENT DOCUMENTS

| | | | | |
|---|---|---|---|---|
| 2008/0198231 | A1* | 8/2008 | Ozdemir | G08B 13/19645 348/E7.086 |
| 2009/0262195 | A1* | 10/2009 | Yoshida | H04N 23/695 348/222.1 |
| 2010/0157064 | A1* | 6/2010 | Cheng | G08B 13/19645 348/169 |
| 2012/0274777 | A1* | 11/2012 | Saptharishi | H04N 7/181 382/103 |
| 2014/0218532 | A1* | 8/2014 | Nerayoff | G08G 1/148 348/148 |
| 2015/0172604 | A1* | 6/2015 | Kim | G06V 20/40 348/159 |
| 2018/0308243 | A1* | 10/2018 | Justice | H04N 23/90 |
| 2019/0371143 | A1* | 12/2019 | Ohtsuji | G08B 13/19613 |

FOREIGN PATENT DOCUMENTS

| | | |
|---|---|---|
| CN | 107666590 | 2/2018 |
| CN | 110113579 | 8/2019 |
| CN | 110177258 | 8/2019 |
| CN | 110278413 | 9/2019 |
| CN | 106412414 | 12/2019 |
| CN | 110533700 | 12/2019 |
| CN | 111405203 | 7/2020 |
| KR | 20130031133 | 3/2013 |
| KR | 20150071504 | 6/2015 |
| WO | WO 00/08856 | 2/2000 |

OTHER PUBLICATIONS

Extended European Search Report issued in corresponding European Application No. 21779203.5, dated Jul. 26, 2023.

* cited by examiner

METHOD AND APPARATUS FOR DETERMINING PICTURE SWITCHING, ELECTRONIC DEVICE, AND STORAGE MEDIUM

CROSS-REFERENCE TO RELATED APPLICATIONS

The present application is a national phase under 35 U.S.C. § 371 of International Application No. PCT/CN2021/083576, filed Mar. 29, 2021, which claims the benefit of priority to Chinese patent application No. 202010239581.X filed with the China National Intellectual Property Administration on May 30, 2020 and entitled "METHOD AND APPARATUS FOR DETERMINING PICTURE SWITCHING, ELECTRONIC DEVICE AND STORAGE MEDIUM", each of which are incorporated herein by reference in their entirety.

TECHNICAL FIELD

The present application relates to the technical field of video surveillance, in particular to a method and an apparatus for determining picture switching, an electronic device and a storage medium.

BACKGROUND

In practical applications, it is usually necessary to monitor the action status of a certain target in real time, so as to track the target. In order to ensure comprehensive monitoring, there are usually multiple monitoring devices in a monitoring scene; Moreover, in order to display video pictures containing the target object, the management platform needs to determine whether to perform a cross-device tracking picture switching for the target object. The so-called cross-device tracking picture switching includes: when a target object is tracked by a certain monitoring device, when the target object enters the overlapping area of a monitoring device and another monitoring device, determining the another monitoring device to which the overlapping area entered by the target object belongs, and performing switching from the currently obtained tracking picture to the monitoring picture acquired by the another monitoring device.

In the related art, for multiple monitoring devices, the overlapping areas among the monitoring devices are determined in advance, so that when the target object enters a certain overlapping area, it is determined to perform cross-device tracking picture switching for the target object. For the target object, the management platform needs to make a large number of complex calculations to determine whether to perform cross-device tracking picture switching. Therefore, a large amount of computing logic needs to be integrated in the management platform, which makes the integration of the management platform difficult.

SUMMARY

The purpose of the embodiments of the present application is to provide a method and an apparatus for determining picture switching, an electronic device and a storage medium, so as to reduce the integration difficulty of a management platform of a monitoring system. The specific technical solutions are as follows.

In a first aspect, an embodiment of the present application provides a method for determining picture switching, which includes the following steps: issuing tracking tasks for a target object to designated multiple monitoring devices; receiving detection events reported by the monitoring devices, wherein the detection events are event information reported by the monitoring devices based on presence statuses of the target object in acquired video pictures; determining to perform cross-device tracking picture switching when the received detection event satisfies a preset condition for an object crossing an acquisition area; wherein, the object crossing the acquisition area means that the target object enters or leaves the acquisition area of one of the multiple monitoring devices.

In a second aspect, an embodiment of the present application provides an apparatus for determining picture switching, which includes a task issuing module, configured for issuing tracking tasks for a target object to designated multiple monitoring devices; an event receiving module, configured for receiving detection events reported by the monitoring devices, wherein the detection events are event information reported by the monitoring devices based on presence statuses of the target object in acquired video pictures; a switching determination module, configured for determining to perform cross-device tracking picture switching when a received detection event satisfies a preset condition for an object crossing an acquisition area; wherein, the object crossing the acquisition area means that the target object enters or leaves the acquisition area of one of the multiple monitoring devices.

In a third aspect, an embodiment of the present application provides an electronic device, including a processor and a memory; the memory configured for storing computer programs; the processor configured to implement the steps of the above-mentioned method for determining any picture switching provided in the first aspect when executing the program stored in the memory.

In a fourth aspect, an embodiment of the present application provides a computer-readable storage medium in which a computer program is stored, wherein the computer programs, when executed by a processor, cause the processor to perform the above-mentioned method for determining picture switching provided in the first aspect.

In a fifth aspect, an embodiment of the present application also provides a computer program product containing instructions which, when executed by a computer, causes the computer to execute the above-mentioned method for determining picture switching provided in the first aspect.

It can be seen from the above that, by applying the solutions provided by the embodiments of the present application, when tracking the target object, the management platform of the monitoring system can receive the detection event reported by the designated monitoring device. Since the detection event reported by the monitoring device is the event information reported by the monitoring device based on the presence status of the target object in the video picture acquired by the monitoring device itself, it can be determined whether the detection event satisfies the preset condition for the object crossing the acquisition area, that is, to determine whether the target object enters or leaves the acquisition area of the monitoring device. Furthermore, when the received detection event satisfies the preset condition for the object crossing the acquisition area, the management platform can directly determine to perform cross-device tracking picture switching for the target object. Based on this, by applying the solutions provided by the embodiment of the present application, the management platform of the monitoring system can directly determine whether to perform the cross-device tracking picture switching according to the received detection events reported by the monitoring devices without a large number of complicated calculations. Therefore, it is not necessary to integrate a large amount of computing logic in the management platform, which reduces the integration difficulty of the management platform.

BRIEF DESCRIPTION OF THE DRAWINGS

In order to more clearly illustrate the embodiments of the present application and the technical solutions of the prior art, the following briefly introduces the drawings required in the embodiments and the prior art. Obviously, the drawings in the following description are only some embodiments of the present application, and those of ordinary skill in the art may also obtain other drawings according to these drawings.

DETAILED DESCRIPTION

Figure 1:
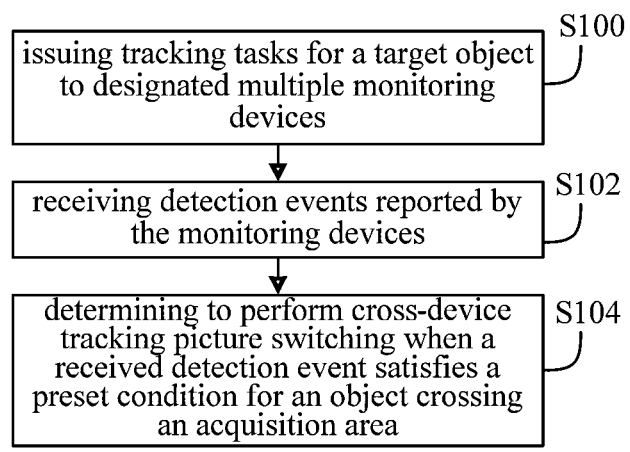
FIG. 1 is a schematic flowchart of a method for determining picture switching provided by an embodiment of the present application.

In order to make the objectives, technical solutions, and advantages of the present application more clearly, the present application will be described in further detail below with reference to the attached drawings and embodiments. Obviously, the described embodiments are only part of the embodiments of the present application, but not all of them. All other embodiments obtained by those ordinary skilled in the art based on the embodiments in the present application fall within the protection scope of the present application.

In the related technology, the overlapping areas among the monitoring devices are determined for multiple monitoring devices in advance. Further, when a target object enters a certain overlapping area, it is determined to perform cross-device tracking picture switching for the target object. The management platform needs to perform a large number of complex calculations to determine whether to perform cross-device tracking picture switching for the target object. Therefore, a large amount of computing logic needs to be integrated in the management platform, which makes the integration of the management platform difficult.

To solve the above technical problems, an embodiment of the present application provides a method for determining picture switching. The method may be applied to a management platform of a monitoring system, and the management platform may establish a communication connection with each monitoring device in the monitoring system, so that the management platform can issue tracking tasks to each monitoring device and receive detection events reported by each monitoring device. In addition, the management platform may be an electronic device of any type, such as a mobile phone, a tablet computer, a laptop, etc., which is not specifically limited in the embodiment of the present application and is hereinafter referred to as the management platform.

A method for determining picture switching provided by the embodiment of the present application may include the following steps:

issuing tracking tasks for a target object to designated multiple monitoring devices;

receiving detection events reported by the monitoring devices, wherein the detection events are event information reported by the monitoring devices based on presence statuses of the target object in acquired video pictures;

determining to perform cross-device tracking picture switching when the received detection event satisfies a preset condition for the object crossing the acquisition area; wherein, the object crossing the acquisition area means that the target object enters or leaves the acquisition area of one of the multiple monitoring devices.

It can be seen from the above that, by applying the solutions provided by the embodiments of the present application, when tracking the target object, the management platform of the monitoring system can receive the detection events reported by the designated monitoring device. Since the detection event reported by the monitoring device is the event information reported by the monitoring device based on the presence status of the target object in the video pictures acquired by the monitoring device itself, it can be determined whether the detection event satisfies the preset condition for the object crossing the acquisition area, that is, to determine whether the target object enters or leaves the acquisition area of the monitoring device. Furthermore, when the received detection event satisfies the preset condition for the object crossing the acquisition area, the management platform can directly determine to perform cross-device tracking picture switching for the target object. Based on this, by applying the solutions provided by the embodiment of the present application, the management platform of the monitoring system can directly determine whether to perform the cross-device tracking picture switching according to the received detection events reported by the monitoring devices without a large number of complicated calculations. Therefore, it is not necessary to integrate a large amount of computing logic in the management platform, which reduces the integration difficulty of the management platform.

Next, a method for determining picture switching provided by the embodiment of the present application will be explained in detail with reference to the drawings.

FIG. 1 is a schematic flowchart of a method for determining picture switching provided by an embodiment of the present application. As shown in FIG. 1, the method may include the following steps:

S100: issuing tracking tasks for a target object to designated multiple monitoring devices;

It may be understood that after determining the target object to be tracked, it is also necessary to determine a monitoring device that can be used to track the target object. Wherein, the monitoring range of each monitoring device in the monitoring system may be calculated in advance, and then according to the monitoring range of each monitoring device in the monitoring system and the possible route direction of the target object, multiple monitoring devices that can cover all the moving areas of the target object in the route direction may be determined, and the multiple monitoring devices determined above may be used as designated multiple monitoring devices.

Figure 2:
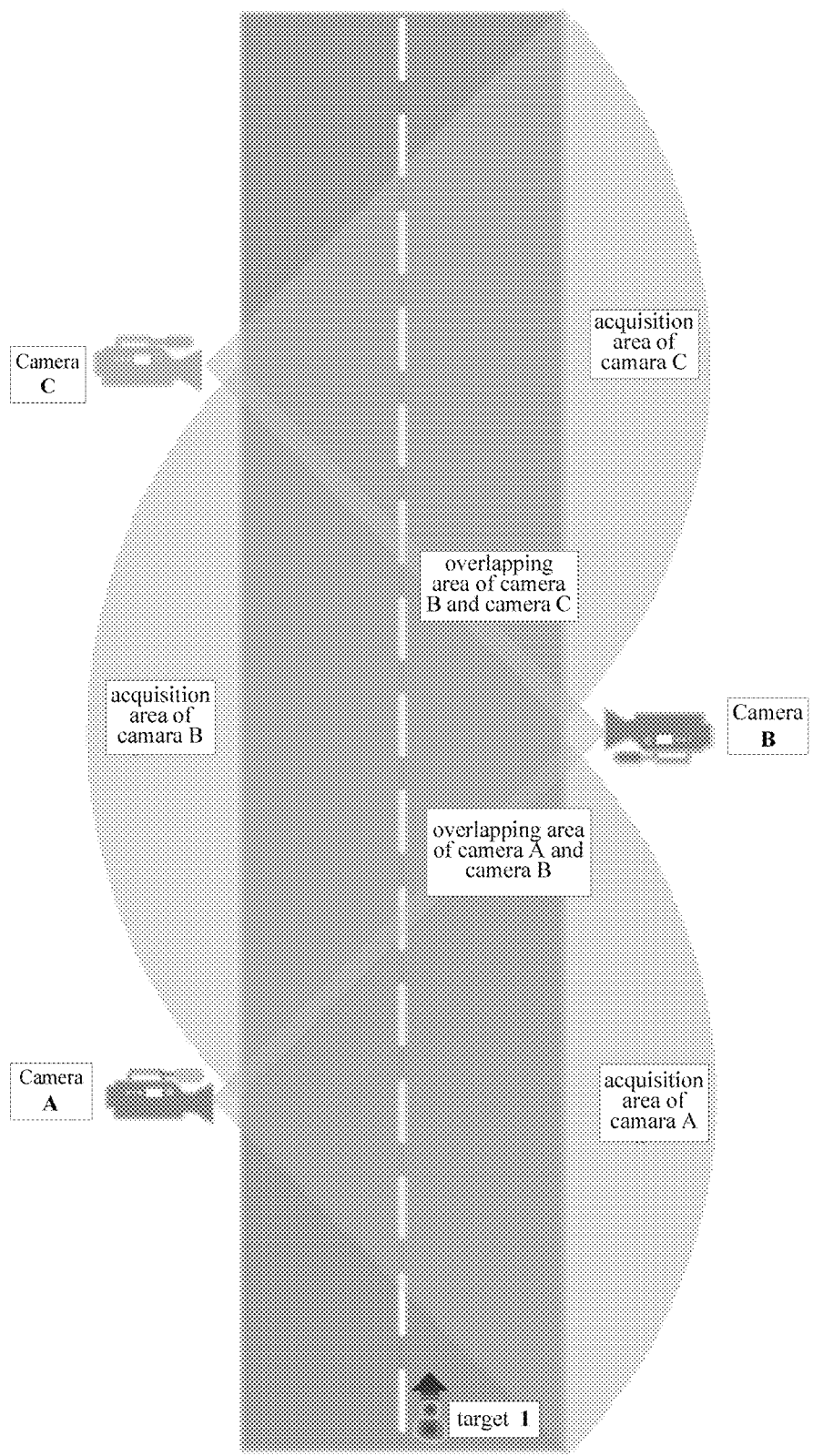
FIG. 2 is a schematic diagram of designated monitoring devices for a target object.

Alternatively, for the entire area in a certain route direction, there may be multiple monitoring devices in the monitoring system that can completely cover entire area. Moreover, among multiple monitoring devices that can completely cover the entire area, there may be an overlapping area between two adjacent monitoring devices, that is, one area may be located within the monitoring ranges of the two monitoring devices. For example, as shown in FIG. 2, target 1 is a target object to be tracked, and the area that the target object may pass through includes the monitoring ranges of cameras A-C. Therefore, cameras A-C are the monitoring devices used to track target 1. When the cameras A-C are dome cameras, the pan/tilt orientations of the cameras A-C may also be initialized according to the possible traveling direction of the target 1, thereby expanding the monitoring ranges of the cameras A-C.

In this way, after multiple monitoring devices for tracking the target object are determined, the determined multiple monitoring devices may be used as the designated multiple monitoring devices in the above step S100. Furthermore, the management platform can issue the tracking tasks for the target object to the designated multiple monitoring devices. Wherein, the target object may be any movable object, which is not specifically limited in the embodiment of the present invention.

In order to enable the designated multiple monitoring devices to detect the target object in the video pictures acquired by themselves and report detection events to the monitoring platform according to the presence statuses of the target object in the video pictures, the tracking tasks issued by the above-mentioned monitoring platform may include the identification information of the target object, so that the designated multiple monitoring devices can use the identification information to detect the target object in the video pictures acquired by themselves. The identification information of the target object may be any information that can uniquely identify the target object, that is, the target object can be uniquely determined according to the identification information of the target object. Furthermore, the information types of identification information of different types of target objects may be the same or different, which are not specifically limited in this embodiment of the present invention. For example, when the target object is a vehicle, the identification information may be license plate information.

In addition, in an embodiment of the present application, the above-mentioned tracking task issued to each of the multiple monitoring devices may include the device task identifiers of these monitoring devices, wherein the device task identifiers of different monitoring devices are different. Furthermore, the event information of the detection event reported by each designated monitoring device may include the device task identifier of the monitoring device that reported the event information.

Alternatively, in a specific implementation, in the above step S100, the tracking tasks issued by the management platform to the designated multiple monitoring devices are for the same target object, and further, the designated monitoring device only supports single-task tracking, that is, the designated monitoring device may only track one target object in the process of executing each tracking task.

Based on this, when the target object tracked by the designated monitoring device needs to be changed, it is necessary to stop and end the tracking tasks performed by the currently designated monitoring device, and issue tracking tasks for a new target object. In this case, the tracking tasks for the target object issued by the management platform may be referred to as a single-target tracking task.

For example, in specific applications, the tracking tasks issued by the management platform to the designated multiple monitoring devices may include the following three contents:

1. Identification information of the target object to be tracked; wherein the identification information has a one-to-one correspondence with the target object, so that the identification information can uniquely identify the target object; for example, when the target object is a vehicle, the identification information may be license plate information.
2. The device task identifier of the monitoring device; different monitoring devices among the designated multiple monitoring devices have different device task identifiers, and the device task identifiers of the monitoring devices are maintained by the management platform and issued to the monitoring devices. Furthermore, when the monitoring device reports detection events to the management platform during the subsequent process of the monitoring device performing the tracking tasks for the target task, the event information of the reported detection event will carry its own device task identifier. Alternatively, the device task identifier of the monitoring device may be consisted of a 64-bit character string.
3. The configuration parameters such as the longest execution time of the tracking task. It can be understood that the tracking tasks for the target object may not be executed without any time limit. Therefore, the management platform needs to inform the designated monitoring device when to stop executing the tracking tasks for the target object, that is, the issued tracking tasks for the target object may include the longest execution time of the tracking task. Of course, for different target objects and specific contents of different tracking tasks, the tracking task may also include other configuration parameters, such as the frequency of reporting detection events by the designated monitoring device.

S102: receiving detection events reported by the monitoring devices;

Wherein, the detection events are event information reported by the monitoring devices based on presence statuses of the target object in acquired video pictures.

After the above step S100 of issuing tracking tasks for a target object to the designated multiple monitoring devices, the management platform may continue to execute the above step S102 to receive the detection events reported by the monitoring devices.

After receiving the above-mentioned tracking tasks for the target object, each designated monitoring device can know the target object that it needs to detect and then can detect the target object in the video picture acquired by itself to determine whether the target object exists in the video picture, so as to report, according to the presence status of the target object in the acquired video picture, the detection event corresponding to the presence status to the management platform. In this way, the management platform can receive the detection events reported by each designated monitoring device.

That is to say, the detection events reported by the monitoring devices received by the management platform refer to the detection events reported by each of the designated multiple monitoring devices, and the detection events reported by each monitoring device are the event information reported by the monitoring device based on presence statuses of the target object in acquired video pictures.

In an embodiment of the present application, since the tracking for the target object may last for a period of time, within which each designated monitoring device may report the detection events to the management platform multiple times, thus the management platform may receive multiple detection events reported by each designated monitoring device.

In addition, for different types of target objects, each designated monitoring device may use various object detection algorithms or object detection models corresponding to the target objects to detect the target objects in the video pictures acquired by itself. For example, when the target object is a vehicle, a license plate detection algorithm may be used.

In an embodiment of the present application, each designated monitoring device may use the received identification information of the target object included in the tracking tasks for the target object to detect the target object in the video picture acquired by itself. In this way, each designated monitoring device may detect the identification information of the target object in the video pictures acquired by itself. For example, when the target object is a vehicle and the identification information is license plate information, each designated monitoring device may detect the license plate information in the video pictures acquired by itself.

In another embodiment of the present application, after receiving the above-mentioned tracking tasks for the target object, each designated monitoring device may detect, according to a predetermined period, the target object in the video picture currently acquired by itself every predetermined time indicated by the predetermined period, to determine whether the target object exists in the video picture, so as to report, according to the presence status of the target object in the acquired video picture, the detection event corresponding to the presence status to the management platform. That is, each monitoring device may report the detection event to the management platform according to the predetermined period.

S104: determining to perform cross-device tracking picture switching when a received detection event satisfies a preset condition for an object crossing an acquisition area.

Wherein, the object crossing the acquisition area means that the target object enters or leaves the acquisition area of one of the designated multiple monitoring devices. That is, when the received detection event satisfies the preset condition for the object crossing the acquisition area, it can indicate that the target object starts to enter the monitoring range of a certain monitoring device, or the target object leaves from the monitoring range of the current monitoring device.

In this way, after receiving the detection event reported by each designated monitoring device, the management platform can determine whether to perform cross-device tracking picture switching according to whether the received detection events satisfy a preset condition for the object crossing the acquisition area. When the received detection event satisfies the preset condition for the object crossing the acquisition area, the management platform can determine to perform the cross-device tracking picture switching.

The management platform may switch the monitoring device that reporting the currently displayed tracking picture to other monitoring devices among the designated multiple monitoring devices, so as to display the tracking picture reported by the switched monitoring device, and use the switched monitoring device to continue tracking the target object.

In addition, when the received detection event indicates that the target object has left the monitoring range of the current monitoring device, and has not continuously moved to enter the monitoring range of any of the designated multiple monitoring devices, the management platform may also stop executing the above-mentioned tracking tasks for the target object.

In the above step S104, the management platform can determine that the received detection event satisfies the preset condition for the object crossing the acquisition area in various ways, which is not specifically limited in the embodiment of the present application. For the sake of clarity, an example will be given in the followings to illustrate the manner in which the management platform determines that the received detection events satisfy the preset condition for the object crossing the acquisition area.

Based on this, by applying the solutions provided by the embodiment of the present application, the management platform of the monitoring system can directly determine whether to perform cross-device tracking picture switching according to the received detection events reported by the monitoring devices, without a large number of complicated calculations. Therefore, a large number of calculation logics do not need to be integrated in the management platform, which reduces the integration difficulty of the management platform.

Figure 3:
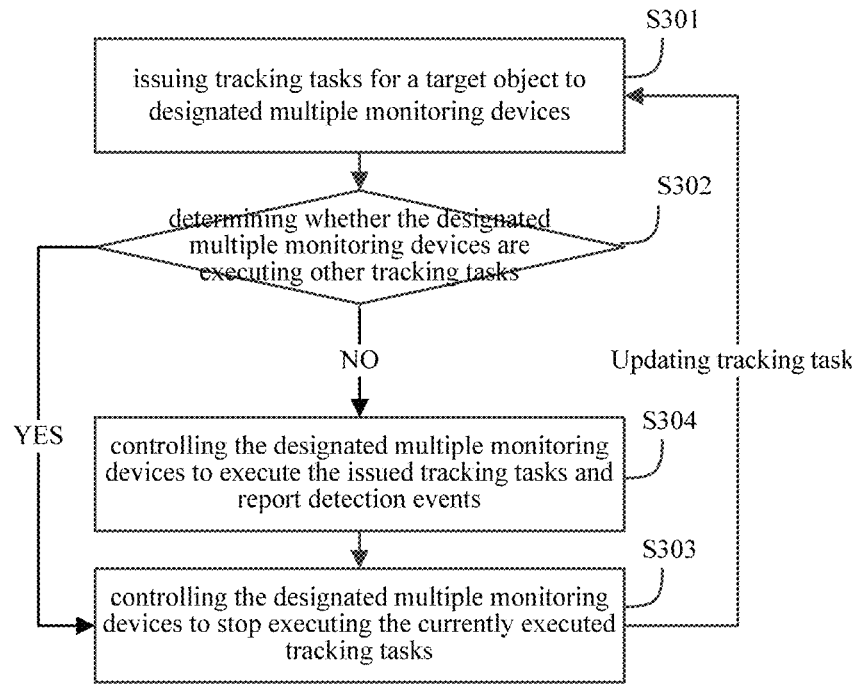
FIG. 3 is a processing flow of the management platform issuing the tracking tasks for the target object to the designated monitoring device.

Alternatively, in a specific manner, as shown in FIG. 3, the processing flow of issuing tracking tasks for a target object by the management platform to the designated monitoring device may include the following steps:

S301: issuing tracking tasks for a target object to designated multiple monitoring devices;

S302, determining whether the designated multiple monitoring devices are executing other tracking tasks; if yes, S303 is executed, otherwise, S304 is executed;

S303: controlling the designated multiple monitoring devices to stop executing the currently executed tracking tasks, and returning to S301;

S304: controlling the designated multiple monitoring devices to execute the issued tracking tasks and report detection events.

After the target object is determined and multiple monitoring devices are designated, the management platform may issue tracking tasks for the target object to the designated multiple monitoring devices. At this time, the designated multiple monitoring devices may be performing other tracking tasks. For this, the management platform can determine whether the designated multiple monitoring devices are performing other tracking tasks based on the task execution statuses of the monitoring devices.

When the management platform determines that the designated multiple monitoring devices are executing other tracking tasks, the management platform may issue task ending instructions to the designated multiple monitoring devices to control the designated multiple monitoring devices to stop executing the currently executed tracking tasks. In this way, the designated multiple monitoring devices may be in an idle state without any task, so that the management platform may issue the above-mentioned tracking tasks for the target object to the designated multiple monitoring devices again.

It should be noted that the tracking tasks performed by the designated multiple monitoring devices have changed before and after the current tracking tasks are stopped, that is to say, the management platform implements the update of the tracking tasks performed by the designated multiple monitoring devices by issuing task ending instructions to the designated multiple monitoring devices and issuing tracking tasks for a target object to the designated multiple monitoring devices again. Since the tracking tasks currently executed by the designated monitoring devices are also issued by the management platform, the above process may be understood as an update of the issued tracking tasks by the management platform.

Correspondingly, when the management platform determines that the designated multiple monitoring devices are not performing other tracking tasks, that is, the designated monitoring devices are in an idle state without any task. In this way, designated multiple monitoring devices can receive the above-mentioned tracking tasks for the target object issued by the management platform. Furthermore, the designated monitoring devices may, under the control of the management platform, execute the received tracking tasks to track the above-mentioned target objects and report the detection events to the management platform in the tracking process.

Furthermore, when the designated multiple monitoring devices execute the received tracking tasks under the control of the management platform, the management platform may also issue a task ending instruction to the designated multiple monitoring devices so as to control the designated multiple devices to stop executing the issued tracking tasks for the target object.

In this way, the management platform may update the tracking tasks for the target object, and issue the updated tracking tasks for the target object to the designated multiple monitoring devices. That is to say, the management platform has updated the issued tracking tasks once again. That is, the management device may execute the above step S304 when the determination result of executing the above step S302 is positive, or it may execute the above step S304 in the process of executing the above step S303.

Before giving a detailed description of the way that the management platform determines that the received detection events satisfy the preset condition for the object crossing the acquisition area, firstly, the related technical contents involved in the determination method are explained.

First, the detection events reported by the designated monitoring device are explained. When the presence statuses of the target object in the video pictures acquired by the monitoring device are different, the detection events reported by the monitoring device may also be different, that is, the detection events may have multiple event types.

Alternatively, in a specific implementation, the event types of the detection events may include a non-end tracking event and an end tracking event. Wherein, the non-end tracking event is the event information reported by a monitoring device when detecting that the target object is in its own acquisition area; the end tracking event is the event information reported by the monitoring device when detecting that the target object leaves its own acquisition area.

For one of the designated multiple monitoring devices, after receiving the tracking tasks for the target object, this monitoring device may perform target object detection on the video pictures acquired by itself, that is, detect the presence statuses of the target object in the video pictures acquired by itself.

When the monitoring device detects the target object in the video pictures acquired by itself, that is, when detecting that the target object is in its own acquisition area, the monitoring device may report the non-end tracking event to the management platform.

When the monitoring device fails to detect the target object in the video pictures acquired by itself, but has detected the target object in the video picture acquired by itself in the last detection before this detection, it indicates that the target object left the acquisition area of the monitoring device between the last detection and this detection, so that the monitoring device can determine that the detected target object left its own acquisition area, and further, the monitoring device may report an end tracking event to the management platform.

That is, the monitoring device may record the detected presence status of the target object in the video picture acquired by itself every time, and when it is detected that the target object is not in its own acquisition area, the monitoring device may read, from the recorded presence statuses, the presence status in the last detection before this detection. Furthermore, when the presence status in the last detection before this detection indicates that the target object is in its own acquisition area, it indicates that the target object moves from the acquisition area of the monitoring device to the outside of the acquisition area of the monitoring device during the time period between this detection and the last detection before this detection, that is, the target object leaves its own acquisition area. Therefore, in this case, the monitoring device may report an end tracking event to the management platform.

Further, alternatively, in a specific implementation, the above-mentioned non-end tracking event may further include a start tracking event and a continuous tracking event. The start tracking event refers to the event information reported by the monitoring device when detecting that the target object enters its own acquisition area; the continuous tracking event refers to the event information reported by the monitoring device when detecting that the target object is in its own acquisition area after the start tracking event is reported and before the end tracking event is reported.

When the monitoring device, after receiving the tracking tasks for the target object, detects the target object in the video picture acquired by itself for the first time, that is, when detecting the presence of the target object in the video picture acquired by itself for the first time, it indicates that the target object enters the acquisition area of the monitoring device from outside the acquisition area of the monitoring device, so that the monitoring device can determine from detection that the target object enters its own acquisition area, and then the monitoring device may report the start tracking event to the management platform; or, when the monitoring device, after reporting the end tracking event to the management platform, detects the target object in the video picture acquired by itself again, since the end tracking event is event information reported by the monitoring device when detecting that the target object leaves its own acquisition area, it can indicate that the target object enters the acquisition area of the monitoring device again from outside the acquisition area of the monitoring device, so that the monitoring device can determine the target object is detected to enter its own acquisition area, and further, the monitoring device may report a start tracking event to the management platform.

Furthermore, the process of the target object passing through the acquisition area of a monitoring device may include three steps: entering the acquisition area, moving in the acquisition area and leaving the acquisition area. When the monitoring device detects that the target object enters its own acquisition area, the monitoring device may report a start tracking event, and when the monitoring device detects that the target object leaves its own acquisition area, the monitoring device may report the end tracking event.

Based on this, it may be explained that the target object moves in the acquisition area of the monitoring device during the time period between the monitoring device reporting the start tracking event and the end tracking event. Furthermore, in this time period, the monitoring device can detect the presence of the target object in the video picture every time it detects the target object in the video picture acquired by itself. Therefore, after the monitoring device reports the start tracking event and before reporting the end tracking event, when the monitoring device detects the target object in the video picture acquired by itself, that is, it detects that the target object is in its own acquisition area, it can report a continuous tracking event to the management platform.

Figure 4:
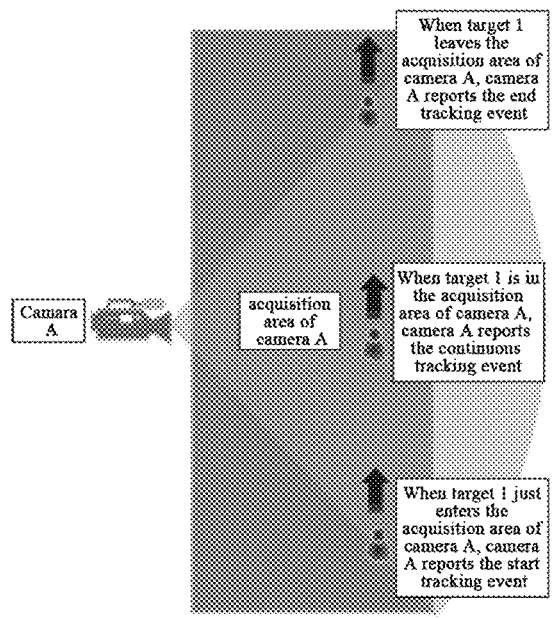
FIG. 4 is a schematic diagram of a target object passing through an acquisition area of a designated monitoring device.

In order to facilitate the understanding of the above-mentioned start tracking events, continuous tracking events and end tracking events, a specific embodiment will be described below. FIG. 4 shows a schematic diagram of a target object passing through an acquisition area of a designated monitoring device. The target 1 in FIG. 4 is the target object, and the camera A is the designated monitoring device. Specifically:

Stage 1: target 1 enters the acquisition area of camera A from outside, when the camera A performs target object detection on the video image acquired by itself. The target 1 is detected for the first time after the target 1 is not detected at least once, camera A can determine that the target 1 enters its own acquisition area, and then camera A reports a start tracking event to the management platform.

Stage 2: target 1 is in the acquisition area of camera A and may move in the acquisition area of camera A. After the start tracking event is reported, camera A can always detect the target 1 when it performs target object detection on the video image acquired by itself, so that camera A reports a continuous tracking event to the management platform.

Stage 3: target 1 moves from the acquisition area of camera A to the outside of the acquisition area of camera A. When camera A performs target object detection on the video image acquired by itself and fails to detect target 1 for the first time after the continuous tracking event is reported at least once, camera A reports an end tracking event to the management platform.

Next, various moving scenarios that may occur during the movement of the target object are explained. Understandably, various moving scenarios may occur during the moving process of the target object. For example, the target object may move linearly within the acquisition areas of multiple monitoring devices. For another example, the target object may turn back and move within the acquisition areas of multiple monitoring devices. Based on this, various moving scenarios that may occur in the moving process of the target object are illustrated below, and various detection events reported by the monitoring devices in various moving scenarios are explained.

Figure 5:
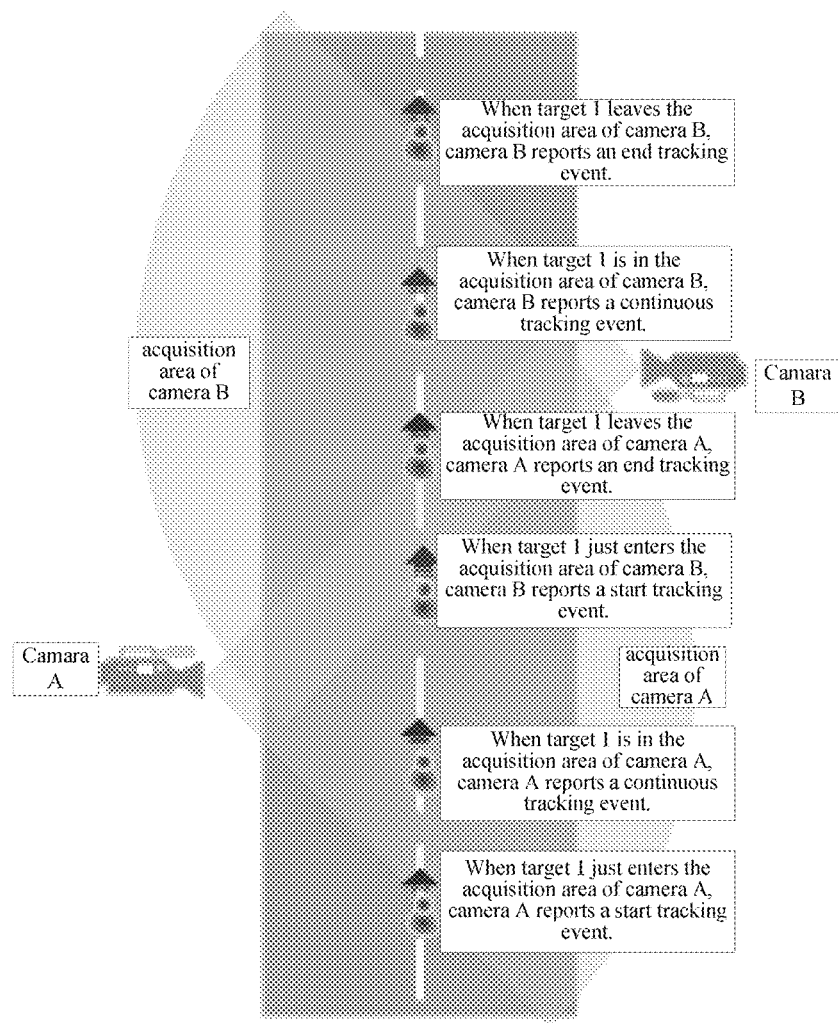
FIG. 5 is a schematic diagram of a target object moving linearly within the monitoring ranges of multiple monitoring devices.

Example 1: FIG. 5 shows a schematic diagram of a target object moving linearly in the acquisition areas of multiple monitoring devices. In FIG. 5, target 1 is the target object, and cameras A and B are the designated monitoring devices.

In this example, the target 1 first enters the acquisition area of camera A; after moving for a certain distance, the target 1 enters the acquisition area of camera B without leaving the acquisition area of camera A. At this time, the target 1 is located in the overlapping acquisition area of camera A and camera B; after moving for a further distance, the target 1 leaves the acquisition area of camera A, but is still located in the acquisition area of camera B; after continuing to move for a certain distance, the target 1 leaves the acquisition area of the camera B, so that the target 1 leaves the monitoring range of the designated monitoring device.

Accordingly, in this example, after receiving tracking tasks for the target 1, the cameras A and B may detect whether the target 1 is present in the video pictures acquired by themselves, and report, according to the detected presence statuses of the target 1 in the acquired video pictures, the detection events corresponding to the presence statuses.

In this way, when the camera A detects the presence of the target 1 in the acquired video picture for the first time, it indicates that the target 1 has entered the acquisition area of the camera A, and then the camera A may report a non-end tracking event or a start tracking event to the management platform.

After that, the camera A reports a non-end tracking event or a continuous tracking event to the management platform every time it detects the presence of the target 1 in the acquired video picture, and in the process, the camera B detects that the target 1 does not exist in the acquired video picture.

Then, since the acquisition areas of cameras A and B overlap, the target 1 will enter the acquisition area of camera B before leaving the acquisition area of camera A. At this time, when camera B detects the presence of target 1 in the acquired video picture for the first time, camera B may report a non-end tracking event or a start tracking event to the management platform. Meanwhile, since the target 1 has not left the acquisition area of camera A, camera A still reports the non-end tracking event or the continuous tracking event to the management platform.

After that, cameras A and B respectively report the non-end tracking event or the continuous tracking event to the management platform every time they detect the presence of target 1 in the video pictures acquired by themselves.

Then, when the camera A detects that target 1 does not exist in the acquired video picture, it indicates that the target 1 has left the acquisition area of the camera A, and then the camera A may report an end tracking event to the management platform. At this time, since the target 1 has not left the acquisition area of camera B, camera B still reports the non-end tracking event or the continuous tracking event to the management platform.

Finally, when camera B detects that target 1 does not exist in the acquired video picture, it indicates that target 1 has left the acquisition area of camera B, and then camera B may report an end tracking event to the management platform.

In this way, target 1 completely leaves the monitoring ranges of cameras A and B, and the tracking tasks for the target 1 are finished. If there is still a camera C or more monitoring devices in the designated monitoring devices, the moving process of the target 1 and the tracking events received by the management platform are similar to those in the above situation.

Figure 6:
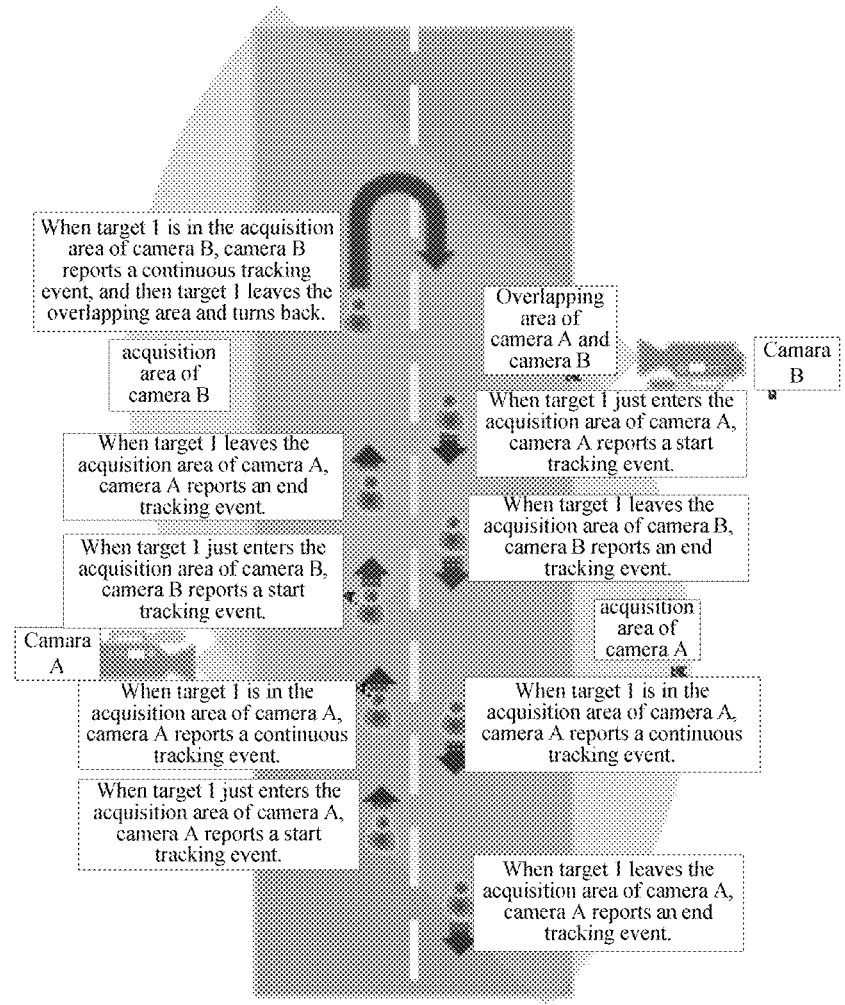
FIG. 6 is a schematic diagram of a target object turning back and moving outside the overlapping area between monitoring ranges of multiple monitoring devices.

Example 2: FIG. 6 shows a schematic diagram of the target object turning back and moving outside the overlapping area between the acquisition areas of multiple monitoring devices. Target 1 in FIG. 6 is the target object, and the cameras A and B are the designated monitoring devices.

In this example, the target 1 first enters the acquisition area of camera A; after moving for a certain distance, the target 1 enters the acquisition area of camera B without leaving the acquisition area of camera A. At this time, the target 1 is located in the overlapping acquisition area of camera A and camera B; after moving for a further distance, the target 1 leaves the acquisition area of camera A, but is still located in the acquisition area of camera B; after continuing to move for a certain distance, the target 1 enters the acquisition area of camera A again without leaving the acquisition area of camera B. At this time, the target 1 is located again in the overlapping acquisition area of camera A and camera B; after moving for a further distance, the target 1 leaves the acquisition area of camera B, but is still located in the acquisition area of camera A; after continuing to move for a certain distance, the target 1 leaves the acquisition area of camera A, that is, the target 1 leaves the monitoring ranges of the designated monitoring devices.

Accordingly, in this example, after receiving the tracking tasks for the target 1, the cameras A and B may detect whether the target 1 is present in the video pictures acquired by themselves, and report, according to the presence detected statuses of the target 1 in the acquired video pictures, the detection events corresponding to the presence statuses.

In this way, when the camera A detects the presence of the target 1 in the acquired video picture for the first time, it indicates that the target 1 has entered the acquisition area of the camera A, and then the camera A may report a non-end tracking event or a start tracking event to the management platform.

After that, the camera A reports a non-end tracking event or a continuous tracking event to the management platform every time it detects the presence of the target 1 in the acquired video picture, and in the process, the camera B detects that the target 1 does not exist in the acquired video picture.

Then, since the acquisition areas of cameras A and B overlap, the target 1 will enter the acquisition area of camera B before leaving the acquisition area of camera A. At this time, when camera B detects the presence of target 1 in the acquired video picture for the first time, camera B may report a non-end tracking event or a start tracking event to the management platform. Meanwhile, since the target 1 has not left the acquisition area of camera A, camera A still reports the non-end tracking event or the continuous tracking event to the management platform.

After that, cameras A and B respectively report the non-end tracking event or the continuous tracking event to the management platform every time they detect the presence of target 1 in the video pictures acquired by themselves.

Then, when the camera A detects that target 1 does not exist in the acquired video picture, it indicates that the target 1 has left the acquisition area of the camera A, and then the camera A may report an end tracking event to the management platform. At this time, since the target 1 has not left the acquisition area of camera B, camera B still reports the non-end tracking event or the continuous tracking event to the management platform.

After that, if the target 1 only moves in the acquisition area of camera B, camera B still reports the non-end tracking event or the continuous tracking event to the management platform, and in the process, camera A detects that target 1 does not exist in the acquired video picture.

Then, when the target 1 moves into the overlapping area of cameras A and B again, it indicates that the target 1 enters the acquisition area of camera A again. At this time, camera A detects that the target 1 enters the acquisition area of camera A again after reporting the end tracking event, and camera A may report the non-end tracking event or the start tracking event to the management platform again.

After that, since the target 1 has not left the acquisition area of camera B, cameras A and B respectively report the non-end tracking event or the continuous tracking event to the management platform every time they detect the presence of target 1 in the video pictures acquired by themselves.

Then, when the camera B detects that target 1 does not exist in the acquired video picture, it indicates that the target 1 has left the acquisition area of the camera B, and then the camera B may report an end tracking event to the management platform. At this time, since the target 1 has not left the acquisition area of camera A, camera A still reports the non-end tracking event or the continuous tracking event to the management platform.

Finally, when camera A detects that target 1 does not exist in the acquired video picture, it indicates that target 1 has left the acquisition area of camera A, and then camera A may report an end tracking event to the management platform.

In this way, the target 1 completely leaves the monitoring ranges of cameras A and B, and the tracking of the target 1 is finished. Correspondingly, if there is still a camera C or more monitoring devices in the designated monitoring devices, the moving process of the target 1 and the tracking events received by the management platform are similar to those in the above situation.

Figure 7:
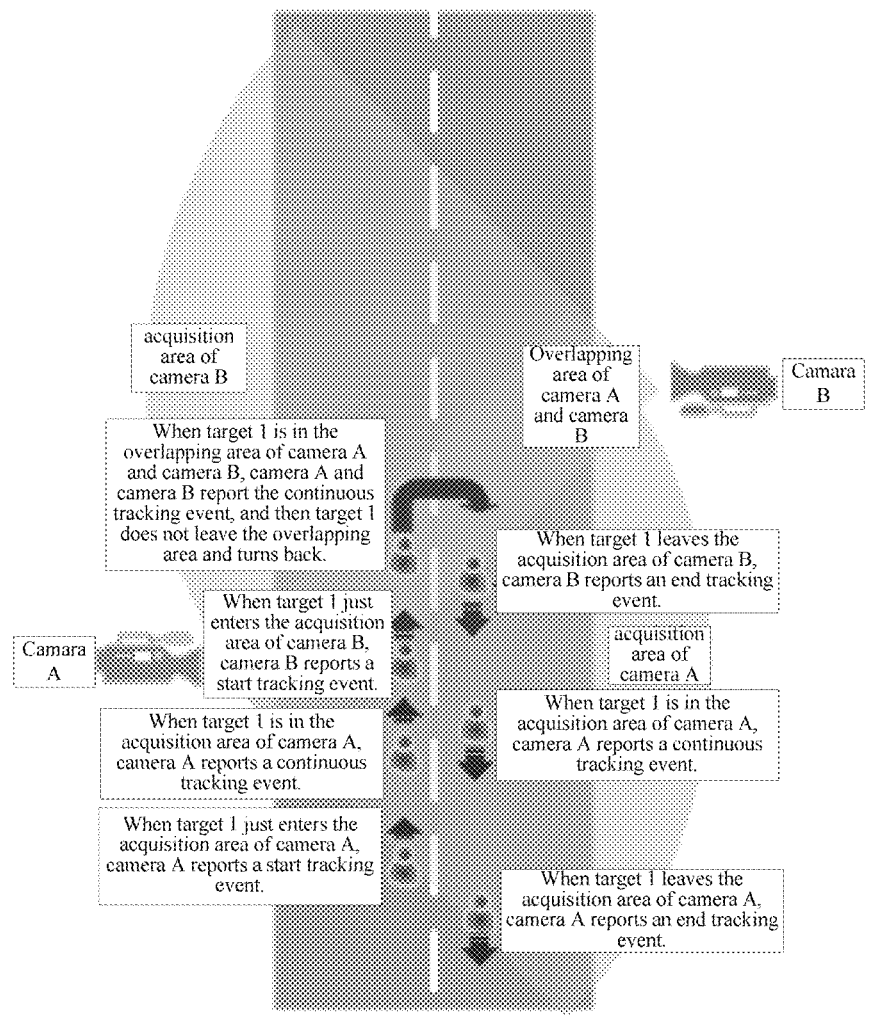
FIG. 7 is a schematic diagram of a target object turning back and moving in the overlapping area between the monitoring ranges of multiple monitoring devices.

Example 3, FIG. 7 shows a schematic diagram of the target object turning back and moving in the overlapping area between the acquisition areas of multiple monitoring devices. The target 1 in FIG. 7 is the target object, and the cameras A and B are the designated monitoring devices.

In this example, the target 1 first enters the acquisition area of camera A; after moving for a certain distance, the target 1 enters the acquisition area of camera B without leaving the acquisition area of camera A. At this time, the target 1 is located in the overlapping acquisition area of camera A and camera B; after moving for a further distance, the target 1 leaves the acquisition area of camera B, but is still located in the acquisition area of camera A; After continuing to move for a certain distance, the target 1 leaves the acquisition area of the camera A, so that the target 1 leaves the monitoring ranges of the designated monitoring devices.

Accordingly, in this example, after receiving the tracking tasks for the target 1, the cameras A and B may detect whether the target 1 is present in the video pictures acquired by themselves, and report, according to the detected statuses of the target 1 in the acquired video pictures, the detection events corresponding to the presence statuses.

In this way, when the camera A detects the presence of the target 1 in the acquired video picture for the first time, it indicates that the target 1 has entered the acquisition area of the camera A, and then the camera A may report a non-end tracking event or a start tracking event to the management platform.

After that, the camera A reports a non-end tracking event or a continuous tracking event to the management platform every time it detects the presence of the target 1 in the acquired video picture, and in the process, the camera B detects that the target 1 does not exist in the acquired video picture.

Then, since the acquisition areas of cameras A and B overlap, the target 1 will enter the acquisition area of camera B before leaving the acquisition area of camera A. At this time, when camera B detects the presence of target 1 in the acquired video picture for the first time, camera B may report the non-end tracking event or the start tracking event to the management platform. Meanwhile, since the target 1 has not left the acquisition area of camera A, camera A still reports the non-end tracking event or the continuous tracking event to the management platform.

After that, cameras A and B respectively report the non-end tracking event or the continuous tracking event to the management platform every time they detect the presence of target 1 in the video pictures acquired by themselves.

Then, when camera B detects that target 1 does not exist in the acquired video picture, it indicates that the target 1 has left the acquisition area of the camera B, and then camera B may report an end tracking event to the management platform. At this time, since the target 1 has not left the acquisition area of camera A, camera A still reports the non-end tracking event or the continuous tracking event to the management platform.

Finally, when camera A detects that target 1 does not exist in the acquired video picture, it indicates that target 1 has left the acquisition area of camera A, and then camera A may report an end tracking event to the management platform.

In this way, the target 1 completely leaves the monitoring ranges of cameras A and B, and the tracking tasks for the target 1 are finished. Correspondingly, if there is still a camera C or more monitoring devices in the designated monitoring devices, the moving process of the target 1 and the tracking events received by the management platform are similar to those in the above situation.

Hereinafter, based on the above description of the event types of the detection events and the moving scenarios of the target objects, the manner in which the management platform determines that the received detection events satisfy the preset condition for the object crossing the acquisition area will be explained in detail.

Figure 8A:
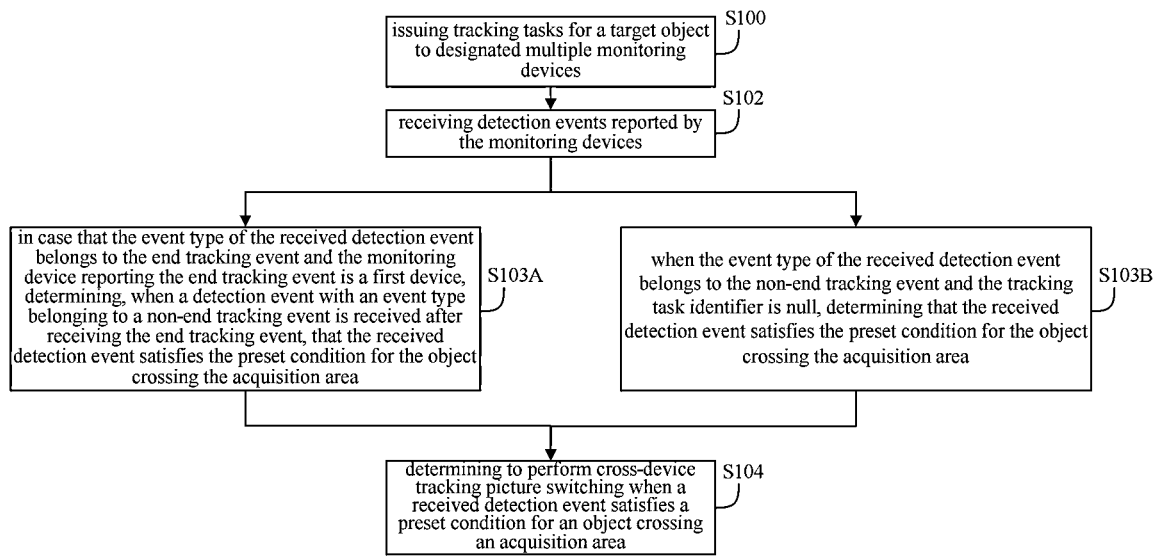
FIG. 8(a) is a schematic flowchart of another method for determining picture switching provided by an embodiment of the present application.

Embodiment 1: Event types of detection events may include a non-end tracking event and an end tracking event. As shown in FIG. 8(*a*), a method for determining picture switching provided by the embodiment of the present application may further include the following step S103A or S103B.

S103A: in case that the event type of the received detection event belongs to the end tracking event and the monitoring device reporting the end tracking event is a first device, determining, when a detection event with an event type belonging to a non-end tracking event is received after receiving the end tracking event, that the received detection event satisfies the preset condition for the object crossing the acquisition area.

Wherein, the first device is a monitoring device that issues the currently displayed tracking picture.

In the process of tracking the target object, the display device in the monitoring system may display a tracking picture for the target object, and the tracking picture is a video picture acquired and sent by one of the designated multiple monitoring devices. The monitoring device may be referred to as the first device.

In an embodiment of the present application, since the tracking task issued to each of the multiple monitoring devices may include the device task identifier of the monitoring device, wherein the device task identifiers of different monitoring devices are different, and the event information of the detection event reported by the monitoring device includes its own device task identifier, the management platform can determine whether the monitoring device reporting the received detection event is the first device by determining whether the device task identifier of the monitoring device reporting the received detection event is the same as that of the first device.

In another embodiment of the present application, in case that the event type of the received detection event belongs to an end tracking event, and the monitoring device that reports the end tracking event is the first device, when receiving a detection event with an event type belonging to a non-end tracking event within a first preset duration after receiving the end tracking event, it is determined that the received detection event satisfies the preset condition for the object crossing the acquisition area.

When the management platform receives a detection event reported by the first device which belongs to an end tracking event, it may be determined that the target object leaves the acquisition area of the first device, and further, there will be no target object in the video picture acquired and sent by the first device. Therefore, when the display device continues to display the video picture sent by the first device, it will be impossible to track the target object.

Furthermore, when the management platform receives the detection event belonging to a non-end tracking event within the first preset duration after receiving the detection event belonging to the end tracking event reported by the first device, it may be determined that the target object is located in the acquisition area of the monitoring device that reported the detection event belonging to the non-end tracking event. Furthermore, when the display device displays the video pictures acquired by the monitoring device that reports the detection event belonging to the non-end tracking event, the tracking of the target object can be continued.

Based on this, in case that the event type of the received detection event belongs to an end tracking event, and the monitoring device that reports the end tracking event is the first device, when receiving a detection event with an event type belonging to a non-end tracking event within a first preset duration after receiving the end tracking event, the management platform can determine that the received detection event satisfies the preset condition for the object crossing the acquisition area. Furthermore, the management platform may execute the above step S104 to determine to perform the cross-device tracking picture switching.

Further, alternatively, the management platform may switch the tracking picture currently displayed by the display device to the video picture acquired by the monitoring device that reports the detection event belonging to the non-end tracking event.

Therefore, in Embodiment 1, for the moving scenarios where the target object turns back and moves in the overlapping area between the acquisition areas of multiple monitoring devices, the management platform can still track the target object, ensuring that the display device can always display the tracking picture of the target object sent by the designated monitoring device.

For example, in the above example of the target 1 turning back and moving in the overlapping area between the acquisition areas of multiple monitoring devices shown in FIG. 7, it is assumed that when the target 1 is located in the overlapping acquisition area of cameras A and B, the first device is camera B. Furthermore, when the target 1 leaves the acquisition area of camera B and is still located in the acquisition area of camera A, the management platform can receive the non-end tracking event sent by camera A at the same time when receiving the end tracking event reported by camera B or within a first preset duration after receiving the end tracking event reported by camera B. In this way, the management platform can determine that the received end tracking event reported by camera B satisfies the preset condition for the object crossing the acquisition area. Furthermore, the management platform can determine to perform cross-device tracking picture switching, and switch the first device to camera A, that is, control the display device to display the video picture acquired and sent by camera A.

S103B: when the event type of the received detection event belongs to the non-end tracking event and the tracking task identifier is null, determining that the received detection event satisfies the preset condition for the object crossing the acquisition area.

Wherein, the tracking task identifier is used to indicate the device task identifier of the monitoring device that is currently to send tracking pictures, and the tracking task identifier is the device task identifier of the first device before it is cleared.

It can be understood that in the process of tracking the target object, the display device in the monitoring system may display the tracking picture for the target object, and the tracking task identifier is recorded in the management platform, that is, the device task identifier identifying the monitoring device that is currently to send the tracking pictures is recorded in the management platform.

Obviously, when the tracking task identifier is not null, the management platform may control the display device to display the tracking picture sent by the monitoring device corresponding to the tracking task identifier. However, when the tracking task identifier is null, even if the display device displays a video picture, the management platform cannot determine, from the designated multiple monitoring devices, the monitoring device that needs to send tracking pictures to the display device. That is, when the tracking task identifier is null, even if the display device displays a video picture, the display device does not track the target object.

In this way, when the management platform receives the detection event that belongs to a non-end tracking event, it can be determined that the target object is located in the acquisition area of the monitoring device that reported the detection event that belongs to the non-end tracking event, and since the tracking task identifier is null, it can be determined that the management platform has not determined a monitoring device that is currently to send tracking pictures, and the display device has not tracked the target object.

Therefore, the management platform can determine to control the display device to display the video pictures acquired by a monitoring device that reporting a detection event that belongs to a non-end tracking event, so as to realize the tracking of the target object through pictures. Therefore, the management platform can determine that the received detection events satisfy the preset condition for the object crossing the acquisition area. Furthermore, the management platform may execute the above step S104 to determine to perform cross-device tracking picture switching.

Further, alternatively, the management platform may switch from the tracking picture currently displayed by the display device to a video picture acquired by a monitoring device that reports a detection event belonging to a non-end tracking event.

In addition, the management platform may also update the tracking task identifier with the device task identifier of the monitoring device that reports the above-mentioned detection event belonging to the non-end tracking event.

Figure 8B:
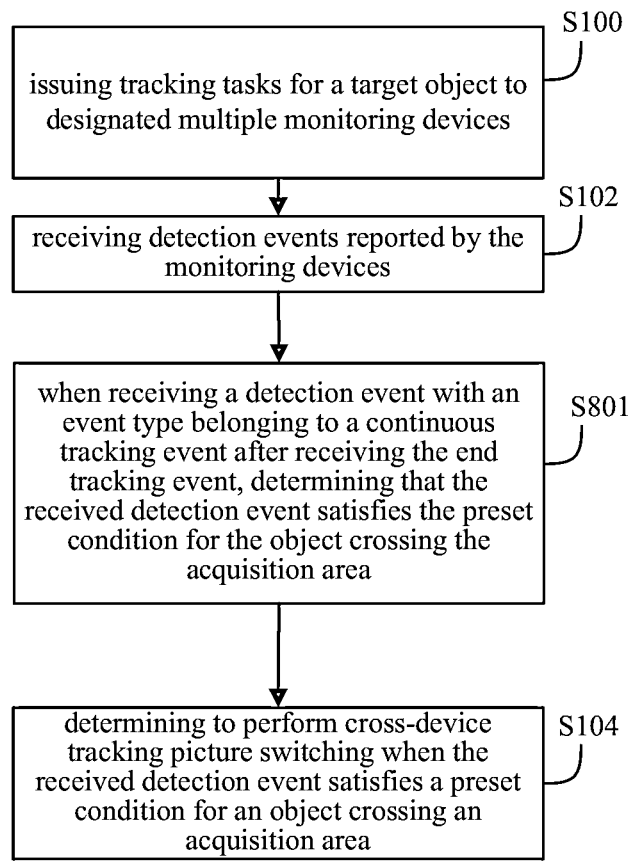
FIG. 8(b) is a schematic flowchart of a specific implementation of the embodiment shown in FIG. 6.

Alternatively, in a specific implementation of Embodiment 1, the non-end tracking event may include a start tracking event and a continuous tracking event. Accordingly, as shown in FIG. 8(b), "when receiving a detection event with an event type belonging to a non-end tracking event after receiving the end tracking event, determining that the received detection event satisfies the preset condition for the object crossing the acquisition area" in the above step S103A may include the following steps:

S801: when receiving a detection event with an event type belonging to a continuous tracking event after receiving the end tracking event, determining that the received detection event satisfies the preset condition for the object crossing the acquisition area.

In an embodiment of the present application, it may be determined that the received detection event satisfies the preset condition for the object crossing the acquisition area when the detection event with an event type belonging to a continuous tracking event is received within a first preset duration after the end tracking event is received.

For example, in the above example of the target 1 turning back and moving in the overlapping area between the acquisition areas of multiple monitoring devices as shown in FIG. 7, it is assumed that when the target 1 is located in the overlapping acquisition area of cameras A and B, the first device is camera B. Furthermore, when the target 1 leaves the acquisition area of camera B but is still located in the acquisition area of camera A, the management platform may receive a continuous tracking event sent by camera A at the same time when receiving the end tracking event reported by camera B or within the first preset duration after receiving the end tracking event reported by camera B. In this way, the management platform can determine that the received end tracking event reported by camera B satisfies the preset condition for the object crossing the acquisition area.

Figure 8C:
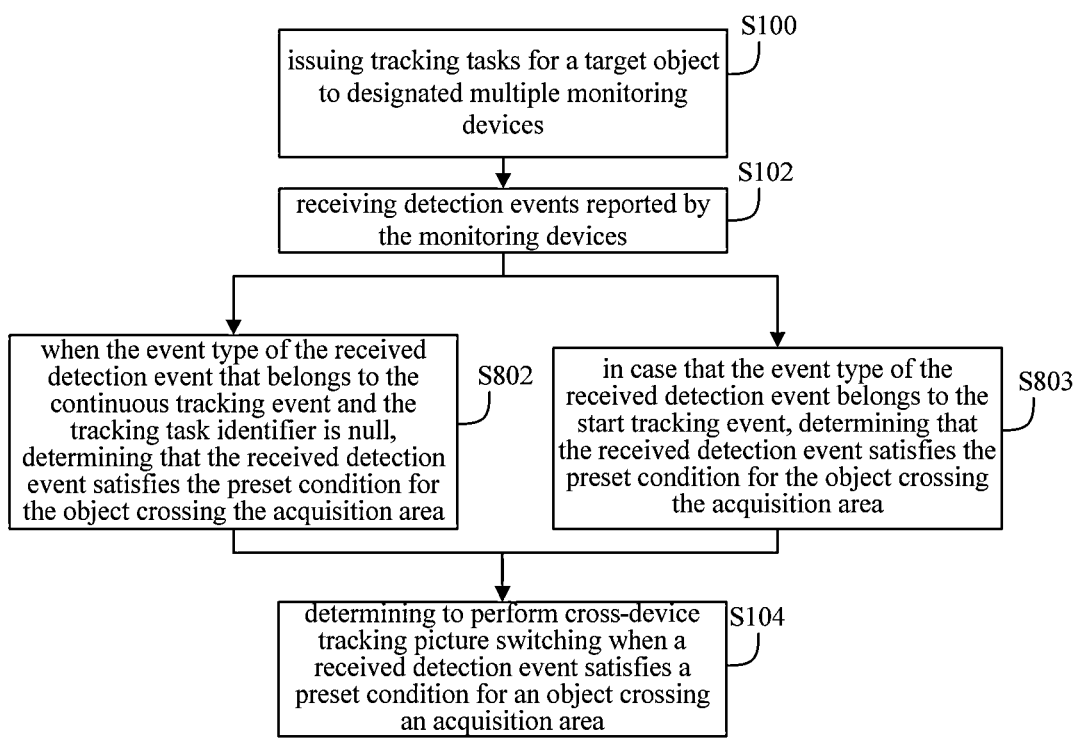
FIG. 8(c) is a schematic flowchart of a specific implementation of the embodiment shown in FIG. 6.

Alternatively, in another specific implementation of Embodiment 1, the non-end tracking event may include a start tracking event and a continuous tracking event. Accordingly, as shown in FIG. 8(c), "when the event type of the received detection event belongs to the non-end tracking event and the tracking task identifier is null, determining that the received detection event satisfies the preset condition for the object crossing the acquisition area" in the above step S103B may include the following steps:

S802: when the event type of the received detection event that belongs to the continuous tracking event and the tracking task identifier is null, determining that the received detection event satisfies the preset condition for the object crossing the acquisition area.

When the management platform receives the detection event that belongs to the continuous tracking event, it can be determined that the target object is located in the acquisition area of the monitoring device that reported the detection event that belongs to the continuous tracking event. Since the tracking task identifier is null, it can be determined that the management platform has not determined the monitoring device that is currently to send tracking pictures, and the display device has not tracked the target object through pictures.

Therefore, the management platform can determine to control the display device to display the video pictures acquired by the monitoring device that reported the detection event that belongs to the continuous tracking event, so as to realize the tracking of the target object through pictures. Therefore, the management platform can determine that the received detection event satisfies the preset conditions that the object crosses the acquisition area.

In addition, as shown in FIG. 8(b), in this specific implementation, a method for determining picture switching provided by the embodiment of the present application may further include the following steps:

S803: in case that the event type of the received detection event belongs to the start tracking event, determining that the received detection event satisfies the preset condition for the object crossing the acquisition area.

When the management platform receives a detection event belonging to the start tracking event, it can be determined that the target object starts to enter the acquisition area of the monitoring device that reported the detection event belonging to the start tracking event, so that the management platform can determine that the received detection event satisfies the preset condition for the object crossing the acquisition area. Furthermore, the management platform may execute the above step S104 to determine to perform cross-device tracking picture switching.

Further, alternatively, the management platform may switch the tracking picture currently displayed by the display device to the video picture acquired by the monitoring device that reports the detection event which belongs to the start tracking event.

It may be understood that when none of the designated monitoring devices reported the start tracking event, the display device may display a video picture, and the video picture may be any video picture, for example, it may be a video picture sent by any monitoring device in the monitoring system, a preset video picture of a video, or even a preset fixed picture.

When the management platform receives the start tracking events reported by the designated multiple monitoring devices for the first time, the video picture displayed by the display device may be not the video picture acquired by the monitoring device that reported the start tracking events for the first time.

Based on this, in this specific implementation, when the management platform receives the start tracking event, it can determine that the received detection event satisfies the preset condition for the object crossing the acquisition area, so as to determine to perform cross-device tracking picture switching. In this way, picture switching can be performed in time when the video picture displayed by the display device is not the video picture acquired by the monitoring device that reported the start tracking event for the first time, thus ensuring that the tracking of the target object through pictures starts when the target object starts to enter the monitoring ranges of the designated monitoring devices.

Figure 9A:
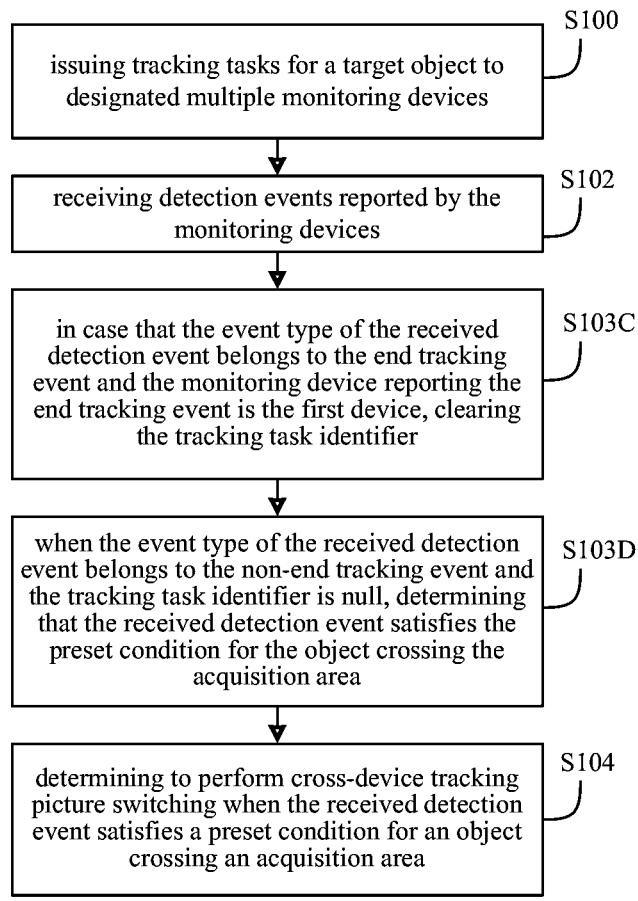
FIG. 9(a) is a schematic flowchart of another method for determining picture switching provided by the embodiment of the present application.

Embodiment 2: Event types of detection events may include a non-end tracking event and an end tracking event. As shown in FIG. 9(a), "in case that the event type of the received detection event belongs to the end tracking event and the monitoring device reporting the end tracking event is the first device, when receiving a detection event with an event type belonging to the non-end tracking event after receiving the end tracking event, determining that the received detection event satisfies the preset condition for the object crossing the acquisition area" in the above-mentioned step S103A may include the following steps S103C and S103D:

S103C: in case that the event type of the received detection event belongs to the end tracking event and the monitoring device reporting the end tracking event is the first device, clearing the tracking task identifier;

S103D: when the event type of the received detection event belongs to the non-end tracking event and the tracking task identifier is null, determining that the received detection event satisfies the preset condition for the object crossing the acquisition area.

Wherein, the related content about the tracking task identifier is the same as the related content about the tracking task identifier in the above step S103B, and details are not repeated here.

Since the first device is the monitoring device that sends the currently displayed tracking picture, and the target object is present in the tracking picture, before the first device reports the end tracking event, the first device is the monitoring device that is currently to send the tracking picture, thus, the tracking task identifier is the device task identifier of the first device.

In this way, when the management platform receives the detection event reported by the first device, which belongs to the end tracking event, the management platform can determine that the target object leaves the acquisition area of the first device, so that there will be no target object in the video picture acquired and sent by the first device. That is, the first device is no longer the monitoring device that is currently to send tracking pictures, and correspondingly, the tracking task identifier will no longer be the device task identifier of the first device. Based on this, the management platform may clear the tracking task identifier.

Furthermore, in case that the tracking task identifier is null, when the management platform receives the detection event that belongs to the non-end tracking event, it can be determined that the received detection event satisfies the preset condition for the object crossing the acquisition area.

The specific content of step S103D is the same as that of step S103B in the embodiment shown in FIG. 6, and will not be repeated here.

Alternatively, in a specific implementation of the second embodiment, the non-end tracking event may include a start tracking event and a continuous tracking event. Accordingly, as shown in FIG. 9(b), "when the event type of the received detection event belongs to the non-end tracking event and the tracking task identifier is null, determining that the received detection event satisfies the preset condition for the object crossing the acquisition area" in the above step S103D may include the following steps:

S901: when the event type of the received detection event belongs to the continuous tracking event and the tracking task identifier is null, determining that the received detection event satisfies the preset condition for the object crossing the acquisition area.

Figure 9B:
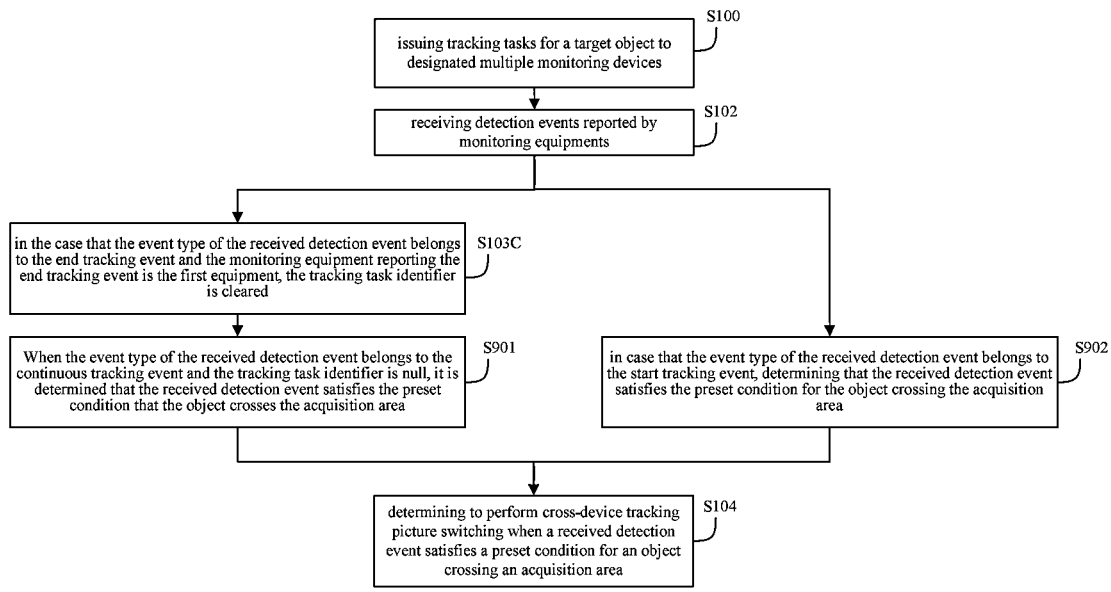
FIG. 9(b) is a schematic flowchart of a specific implementation of the embodiment shown in FIG. 6.

In addition, as shown in FIG. 9(b), in this specific implementation, a method for determining picture switching provided by the embodiment of the present application may further include the following steps:

S902: in case that the event type of the received detection event belongs to the start tracking event, determining that the received detection event satisfies the preset condition for the object crossing the acquisition area.

The specific contents of steps S901-S902 are the same as those of steps S602-S603 in the embodiment shown in FIG. 6(b) above, and will not be repeated here.

In order to better understand the method for determining picture switching provided by the specific implementation shown in FIG. 9(b), the moving scenarios shown in FIGS. 5-7 will be specifically explained.

For the moving scenarios in which the target object moves linearly in the acquisition areas of multiple monitoring devices as shown in FIG. 5:

Stage 1: target 1 has not entered the acquisition areas of camera A and camera B, and neither camera A nor camera B reports any detection event to the management platform.

Stage 2: target 1 enters the acquisition area of camera A, but does not enter the acquisition area of camera B; camera A reports a start tracking event to the management platform, and camera B does not report any detection event to the management platform; the management platform determines that the received start tracking event satisfies a preset condition for the object crossing the acquisition area, and then determines to perform cross-device tracking picture switching, so that camera A is determined as the first device and it starts to display the tracking pictures sent by camera A.

Stage 3: target 1 is located in the acquisition area of camera A, but does not enter in the acquisition area of camera B; camera A reports a continuous tracking event to the management platform, and camera B does not report any detection event to the management platform; the management platform determines that the received continuous tracking event does not meet the preset condition for the object crossing the acquisition area, and further determines to perform the cross-device tracking picture switching, so that the camera A is still determined as the first device and it continues to display the tracking picture sent by the camera A.

Stage 4: target 1 is located in the acquisition area of camera A, and enters the acquisition area of camera B, camera A reports the continuous tracking event to the management platform, and camera B reports a start tracking event to the management platform; the management platform determines that the received start tracking event reported by camera B satisfies the preset condition for the object crossing the acquisition area, and then determines to perform cross-device tracking picture switching, so as to switch the first device to camera B and switch the displayed tracking picture to the tracking picture sent by camera B.

Stage 5: target 1 is located in the overlapping acquisition area of camera A and camera B, and both camera A and camera B report continuous tracking events to the management platform. The management platform determines that the received continuous tracking events do not meet the preset condition for the object crossing the acquisition area, and then determines not to perform the cross-device tracking picture switching, so that camera B is still determined as the first device and it continues to display the tracking pictures sent by camera B.

Stage 6: target 1 leaves the acquisition area of camera A, and is located in the acquisition area of camera B. Camera A reports an end tracking event to the management platform, and camera B reports a continuous tracking event to the management platform. The management platform determines that both the received end tracking event and continuous tracking event do not satisfy the preset conditions for the object crossing the acquisition areas, and then determines not to perform the cross-device tracking picture switching, so that camera B is still determined as the first device and it continues to display the tracking picture sent by camera B.

Stage 7: target 1 is located outside the acquisition area of camera A and within the acquisition area of camera B. Camera A does not report any detection event to the management platform, and camera B reports the continuous tracking event to the management platform. The management platform determines that the received continuous tracking event does not satisfy the preset condition for the object crossing the acquisition area, and then determines not to perform cross-device tracking picture switching, so that camera B is still determined as the first device and it continues to display the tracking pictures sent by camera B.

Stage 8: target 1 is located outside the acquisition area of camera A, and leaves the acquisition area of camera B. Camera A does not report any detection event to the management platform, and camera B reports an end tracking event to the management platform. The management platform clears the tracking task identifier and no longer displays the tracking picture sent by camera B.

After Stage 8, the tracking tasks for target 1 are completed.

For the moving scenarios in which the target object turns back outside the overlapping area between the acquisition areas of multiple monitoring devices and moves as shown in FIG. 6:

Stage 1: target 1 has not entered the acquisition areas of camera A and camera B, and neither camera A nor camera B reported any detection event to the management platform.

Stage 2: target 1 enters the acquisition area of camera A, and camera 1 does not enter the acquisition area of camera B. Camera A reports a start tracking event to the management platform, and camera B does not report any detection event to the management platform. The management platform determines that the received start tracking event satisfies a preset condition for the object crossing the acquisition area, and then determines to perform cross-device tracking picture switching, so that camera A is determined as the first device and it starts to display the tracking pictures sent by camera A.

Stage 3: target 1 is located in the acquisition area of camera A, but does not enter the acquisition area of camera B. Camera A reports a continuous tracking event to the management platform, and camera B does not report any detection event to the management platform. The management platform determines that the received continuous tracking event does not meet the preset condition for the object crossing the acquisition area, and further determines not to perform the cross-device tracking picture switching, so that the camera A is still determined as the first device and it continues to display the tracking picture sent by the camera A.

Stage 4: target 1 is located in the acquisition area of camera A, and enters the acquisition area of camera B. Camera A reports the continuous tracking event to the management platform, and camera B reports a start tracking event to the management platform. The management platform determines that the received start tracking event reported by camera B satisfies the preset condition for the object crossing the acquisition area, and then determines to perform cross-device tracking picture switching, so as to switch the first device to camera B and switch the displayed tracking picture to the tracking picture sent by camera B.

Stage 5: target 1 is located in the overlapping acquisition area of camera A and camera B, and both camera A and camera B report continuous tracking events to the management platform. The management platform determines that the received continuous tracking events do not meet the preset condition for the object crossing the acquisition area, and then determines not to perform cross-device tracking picture switching, so that camera B is still determined as the first device and it continues to display the tracking pictures sent by camera B.

Stage 6: target 1 leaves the acquisition area of camera A, and is located in the acquisition area of camera B. Camera A reports an end tracking event to the management platform, and camera B reports a continuous tracking event to the management platform. The management platform determines that both the received end tracking event and the continuous tracking event do not satisfy the preset conditions for the object crossing the acquisition areas, and then determines not to perform the cross-device tracking picture switching, so that camera B is still determined as the first device and it continues to display the tracking picture sent by camera B.

Stage 7: target 1 is located outside the acquisition area of camera A and within the acquisition area of camera B. Camera A does not report any detection event to the management platform, and camera B reports the continuous tracking event to the management platform. The management platform determines that the received continuous tracking event does not satisfy the preset condition for the object crossing the acquisition area, and then determines not to perform cross-device tracking picture switching, so that camera B is still determined as the first device and it continues to display the tracking pictures sent by camera B.

Stage 8: target 1 enters the acquisition area of camera A, and is located in the acquisition area of camera B. Camera A reports a start tracking event to the management platform, and camera B reports the continuous tracking event to the management platform. The management platform determines that the received start tracking event satisfies the preset condition that the object crosses the acquisition area, and then determines to perform cross-device tracking picture switching, so that the first device is switched to camera A, and the displayed tracking picture is switched to the tracking picture sent by camera A.

Stage 9: target 1 is located in the overlapping acquisition area of camera A and camera B. Both camera A and camera B report continuous tracking events to the management platform, and the management platform determines that the received continuous tracking events do not meet the preset conditions for the object crossing the acquisition areas, and then determines not to perform cross-device tracking picture switching, so that camera A is still determined as the first device and it continues to display the tracking pictures sent by camera A.

Stage 10: target 1 is located within the acquisition area of camera A, and leaves the acquisition area of camera B. Camera A reports the continuous tracking event to the management platform, and camera B reports an end tracking event to the management platform. The management platform determines that both the received end tracking event and continuous tracking event do not meet the preset conditions for the object crossing the acquisition areas, and then determines not to perform the cross-device tracking picture switching, so that camera A is still determined as the first device, and it continues to display the tracking picture sent by camera A.

Stage 11: target 1 is located within the acquisition area of camera A, and is located outside the acquisition area of camera B. Camera A reports the continuous tracking event to the management platform, but camera B does not report any detection event to the management platform. The management platform determines that the received continuous tracking event does not satisfy the preset condition for the object crossing the acquisition area, and then determines not to perform the cross-device tracking picture switching, so that camera A is still determined as the first device and it continues to display the tracking pictures sent by camera A.

Stage 12: target 1 leaves the acquisition area of camera A, and is located outside the acquisition area of camera B. Camera A reports an end tracking event to the management platform, camera B does not report any detection event to the management platform, and the management platform clears the tracking task identifier and no longer displays the tracking picture sent by camera A.

After stage 12, the tracking tasks for target 1 are completed.

For the moving scenarios in which the target object turns back and moves in the overlapping area between the acquisition areas of multiple monitoring devices as shown in FIG. 7:

Stage 1: target 1 has not entered the acquisition areas of camera A and camera B, and neither camera A nor camera B reported any detection event to the management platform.

Stage 2: target 1 enters the acquisition area of camera A, but does not enter the acquisition area of camera B. Camera A reports a start tracking event to the management platform, and camera B does not report any detection event to the management platform. The management platform determines that the received start tracking event satisfies a preset condition for the object crossing the acquisition area, and then determines to perform cross-device tracking picture switching, so that camera A is determined as the first device and it starts to display the tracking pictures sent by camera A.

Stage 3: target 1 is located in the acquisition area of camera A, and does not enter the acquisition area of camera B. Camera A reports a continuous tracking event to the management platform, and camera B does not report any detection event to the management platform. The management platform determines that the received continuous tracking event does not meet the preset condition for the object crossing the acquisition area, and further determines not to perform the cross-device tracking picture switching, so that the camera A is still determined as the first device and it continues to display the tracking picture sent by the camera A.

Stage 4: target 1 is located in the acquisition area of camera A, and enters the acquisition area of camera B. Camera A reports the continuous tracking event to the management platform, and camera B reports a start tracking event to the management platform. The management platform determines that the received start tracking event reported by camera B satisfies the preset condition for the object crossing the acquisition area, and then determines to perform cross-device tracking picture switching, so as to switch the first device to camera B and switch the displayed tracking picture to the tracking picture sent by camera B.

Stage 5: target 1 is located in the overlapping acquisition area of camera A and camera B, and both camera A and camera B report continuous tracking events to the management platform. The management platform determines that the received continuous tracking events do not meet preset conditions for the object crossing the acquisition areas, and then determines not to perform cross-device tracking picture switching, so that camera B is still determined as the first device and it continues to display the tracking pictures sent by camera B.

Stage 6: target 1 is located in the acquisition area of camera A, and leaves the acquisition area of camera B. Camera A reports the continuous tracking event to the management platform, and camera B reports an end tracking event to the management platform. The management platform clears the tracking task identifier, and determines that the received continuous tracking event satisfies the preset condition for the object crossing the acquisition area, and then determines to perform cross-device tracking picture switching, so as to switch the first device to camera A and switch the displayed tracking picture to the tracking picture sent by camera A.

Stage 7: target 1 is located in the acquisition area of camera A and outside the acquisition area of camera B. Camera A reports the continuous tracking event to the management platform, but camera B does not report any detection event to the management platform. The management platform determines that the received continuous tracking event does not satisfy the preset condition for the object crossing the acquisition area, and then determines not to perform cross-device tracking picture switching, so that camera A is still determined as the first device and it continues to display the tracking pictures sent by camera A.

Stage 8: target 1 leaves the acquisition area of camera A, and is located outside the acquisition area of camera B. Camera A reports an end tracking event to the management platform, and camera B does not report any detection event to the management platform. The management platform clears the tracking task identifier and no longer displays the tracking picture sent by camera A.

After Stage 8, the tracking tasks for target 1 are completed.

According to the above specific descriptions for the moving scenarios of FIGS. 5-7 respectively, in a method for determining picture switching provided by the specific implementation shown in FIG. 9(*b*), various detection events have different processing priorities, wherein the processing priority of the start tracking event is higher than that of the continuous tracking event, and the processing priority of the continuous tracking event is higher than that of the end tracking event. That is, the start tracking event has the highest processing priority, the continuous tracking event has the second highest processing priority, and the end tracking event has the lowest processing priority.

Based on the above detailed description of the moving scenarios of FIGS. 5-7, the processing logic of the management platform during picture switching determination can be obtained in a method for determining picture switching provided by the specific implementation shown in FIG. 9(*b*).

Figure 10:
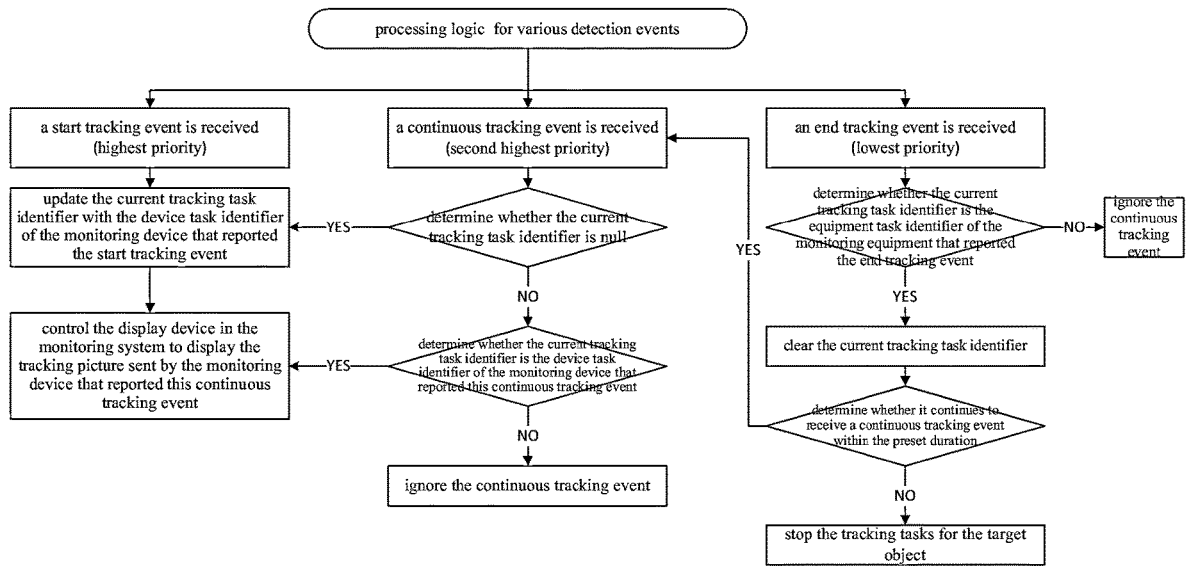
FIG. 10 is a schematic flowchart of the processing logic of the management platform for various detection events in the specific implementation shown in FIG. 9(b)

FIG. 10 is a flowchart of the processing logic of the management platform for various detection events in the specific implementation shown in FIG. 9(*b*). Wherein, when issuing tracking tasks for a target object to designated multiple monitoring devices, the current tracking task identifier is cleared. Since the tracking task identifier is used to indicate the device task identifier of the monitoring device that is currently to send tracking pictures, when the designated monitoring devices have received the tracking tasks but have not reported any detection event, the management platform does not determine the monitoring device that is currently to send tracking pictures.

1. Processing logic about start track events:

The start tracking event has the highest processing priority. In this way, when the start tracking event is received, the management platform can update the current tracking task identifier with the device task identifier of the monitoring device that reported the start tracking event.

In addition, the management platform may also control the monitoring device that reported the start tracking event to send the video picture acquired by itself, so that the management platform may control a display device in the monitoring system to display tracking pictures sent by the monitoring device that reported the start tracking event.

2. Processing logic of continuous tracking events:

The continuous tracking event has the second highest processing priority, that is, the processing priority of continuous tracking event is lower than that of the start tracking event and higher than that of the end tracking event. In this way, when a continuous tracking event is received, the management platform firstly determines whether the current tracking task identifier is null.

When the management platform determines that the current tracking task identifier is null, the management platform may update the current tracking task identifier with the device task identifier of the monitoring device that reported the continuous tracking event. In addition, the management platform may also control the monitoring device that reported the continuous tracking event to send video pictures acquired by itself, so that the management platform may control the display device in the monitoring system to display the tracking pictures sent by the monitoring device that reported the continuous tracking event.

When the management platform determines that the current tracking task identifier is not null, the management platform may further determine whether the current tracking task identifier is the device task identifier of the monitoring device that reported this continuous tracking event.

When the management platform determines that the current tracking task identifier is the device task identifier of the monitoring device that reported this continuous tracking event, it indicates that the tracking picture displayed by the display device in the monitoring system is the tracking picture sent by the monitoring device that reported this continuous tracking event, and the management platform may continue to control the display device in the monitoring system to display the tracking picture sent by the monitoring device that reported this continuous tracking event.

When the management platform determines that the current tracking task identifier is not the device task identifier of the monitoring device that reported this continuous tracking event, the management platform may ignore this continuous tracking event, that is, the management platform does not change the current tracking task identifier and the monitoring device that sends the displayed tracking picture.

3. Processing logic about the end tracking events:

The end tracking event has the lowest processing priority. In this way, when the end tracking event is received, the management platform can determine whether the current tracking task identifier is the device task identifier of the monitoring device that reported this end tracking event.

When the management platform determines that the current tracking task identifier is not the device task identifier of the monitoring device that reported this end tracking event, the management platform may ignore this continuous tracking event. That is, the management platform does not change the current tracking task identifier and the monitoring device that sends the displayed tracking picture.

When the management platform determines that the current tracking task identifier is the device task identifier of the monitoring device that reported this end tracking event, the management platform may clear the current tracking task identifier.

After the management platform clears the current tracking task identifier, the management platform may further determine whether it continues to receive a continuous tracking event within the preset duration.

Since the continuous tracking events may be reported by a designated monitoring device according to a preset reporting frequency, for example, once every second, when the management platform continues to receive a continuous tracking event within the preset duration, the management platform may continue to execute the related steps in the above-mentioned "processing logic about continuous tracking events". The preset duration is determined according to the preset reporting frequency.

When the management platform does not receive any continuous tracking event within the preset duration, the management platform can determine that the tracking of the target object is finished, thereby stopping the tracking tasks for the target object.

Alternatively, based on the embodiments shown in FIGS. 8(a), 8(b), 9(a) and 9(b) above, in another specific implementation provided by the embodiment of the present application, in case that the event type of the received detection event belongs to the end tracking event and the monitoring device that reports the end tracking event is the first device, a method for determining picture switching provided by the embodiment of the present application may further include the following steps:

if no detection event with an event type belonging to the non-end tracking event is received within the second preset duration after receiving the end tracking event, the tracking tasks are stopped.

When the management platform receives a detection event reported by the first device belonging to a non-end tracking event, it can determine that the target object leaves the acquisition area of the first device. Furthermore, when the management platform does not receive a detection event with an event type belonging to a non-end tracking event within the second preset duration after receiving the detection event belonging to the end tracking event, the management platform can determine that the target object is outside the monitoring ranges of the designated monitoring devices, that is, it can determine that the target object has completely left the monitoring ranges of the designated multiple monitoring devices. Therefore, the management platform can determine that the tracking of the target object is finished, and then the management platform can stop the tracking tasks for the target object.

In an embodiment of the present application, the management platform may issue a tracking task stop instruction to each designated monitoring device, so that after receiving the tracking task stop instruction, each designated monitoring device can stop detecting the target object in the video picture acquired by itself, and then stop reporting the detection event to the management platform. At this point, it can be determined that the tracking tasks for the target object have been completed.

Wherein, the above second preset duration is not less than the above first preset duration, and the specific values of the above first preset duration and the above second preset duration may be determined according to the requirements in practical applications and the performances of the management platform and monitoring devices in the practical application, which is not specifically limited by the embodiment of the present application.

Figure 11:
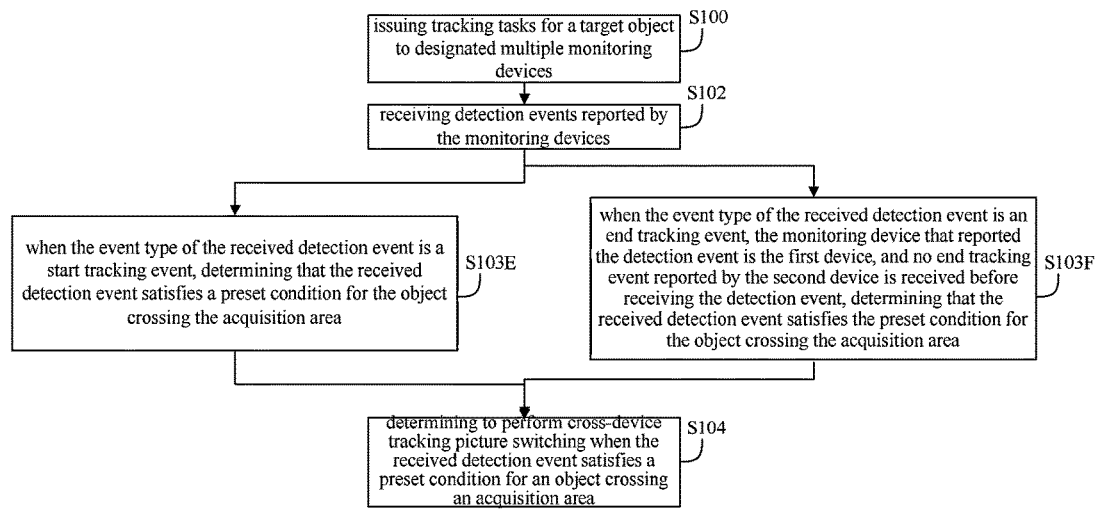
FIG. 11 is a schematic flowchart of another method for determining picture switching provided by an embodiment of the present application.

Embodiment 3: The event types of detection events may include start tracking events and end tracking events. As shown in FIG. 11, a method for determining picture switching provided by the embodiment of the present application may further include the following steps S103E and S103F, wherein, it should be noted that, in the third embodiment, the execution order of S103E and S103F is not limited, but S103E or S103F is executed according to the event types of the received events to be detected.

S103E: when the event type of the received detection event is a start tracking event, determining that the received detection event satisfies a preset condition for the object crossing the acquisition area;

when the management platform receives a start tracking event, it can be determined that the target object starts to enter the acquisition area of the monitoring device that reported this start tracking event, so that the management platform can determine that the received detection event satisfies the preset condition for the object crossing the acquisition area. Furthermore, the management platform may execute the above step S104 to determine to perform cross-device tracking picture switching.

When none of the designated monitoring devices reported any start tracking event, the display device may display a video picture, and the video picture may be any video picture, for example, it may be a video picture sent by any monitoring device in the monitoring system, a preset video picture of a video, or even a preset fixed picture.

When the management platform receives a start tracking event that a designated multiple monitoring device reported for the first time, the video picture displayed by the display device may be not the video picture acquired by the monitoring device that reported this start tracking event for the first time.

Based on this, in the third embodiment, when the management platform receives the start tracking event, it can determine that the received detection event satisfies a preset condition for the object crossing the acquisition area, so as to determine to perform cross-device tracking picture switching. In this way, picture switching is performed in time when the video picture displayed by the display device is not the video picture acquired by the monitoring device that reported this start tracking event for the first time, thus ensuring that the tracking of the target object through pictures starts when the target object starts to enter the monitoring ranges of the designated monitoring devices.

In addition, during the moving process of the target object, the target object may move to the overlapping area of two monitoring devices, and when the target object enters the overlapping area of two monitoring devices, it may first enter the acquisition area of one monitoring device, and then enter the acquisition area of the other monitoring device without leaving the acquisition area of the monitoring device. In this way, when entering the acquisition area of the other monitoring device, the management platform may receive the start tracking event reported by the other monitoring device, and thus, the management platform can determine that the received detection event satisfies the preset condition for the object crossing the acquisition area. Furthermore, the management platform may execute the above step S104 to determine to perform cross-device tracking picture switching.

In this way, in the third embodiment, the tracking picture switching can be performed when the target object enters the acquisition area of a monitoring device, so that respective monitoring devices for the acquisition areas through which the target object passes in the moving process and the sequences of passing through the acquisition areas of respective monitoring devices may be obtained.

For example, in the example that the target 1 turns back and moves outside the overlapping area between the acquisition areas of multiple monitoring devices as shown in FIG. 6, and in the example that the target 1 turns back and moves in the overlapping area between the acquisition areas of multiple monitoring devices as shown in FIG. 7, the target 1 can first enter the acquisition area of camera A, and then enter the acquisition area of camera B before leaving the acquisition area of camera A, thus entering the overlapping area of cameras A and B.

Then, when the target 1 enters the acquisition area of camera A, camera A may report a start tracking event to the management platform, so that the management platform can determine that the received detection event satisfies a preset condition for the object crossing the acquisition area. Furthermore, it is determined to perform cross-device tracking picture switching. After that, after moving for a certain distance, the target 1 may enter the acquisition area of camera B without leaving the acquisition area of camera A, and then camera B may report a start tracking event to the management platform, so that the management platform can determine that the received detection event satisfies the preset condition that the object crosses the acquisition area. Furthermore, it is determined to perform cross-device tracking picture switching again.

S103F: when the event type of the received detection event is an end tracking event, the monitoring device that reported the detection event is the first device, and no end tracking event reported by the second device is received before receiving the detection event, determining that the received detection event satisfies the preset condition for the object crossing the acquisition area;

The first device is a monitoring device that sends a currently displayed tracking picture, and the second device is a monitoring device that reports a previous received start tracking event, wherein the previous received start tracking event is a last received start tracking event before receiving the start tracking event sent by the first device.

In an embodiment of the present application, since the tracking task sent to each of the multiple monitoring devices may include the device task identifier of the monitoring device, wherein the device task identifiers of different monitoring devices are different, and the event information of the detection event reported by the monitoring device includes its own device task identifier, the management platform can determine whether the monitoring device reporting the received detection event is the first device by determining whether the device task identifier of the monitoring device reporting the received detection event is the same as that of the first device.

When receiving an end tracking event sent by the first device, the management platform can determine that the target object leaves the acquisition area of the first device, and further, the management device can determine whether an end tracking event sent by the second device is received before receiving the end tracking event sent by the first device.

Since the management device has received the start tracking event reported by the second device, the management device can determine that the target object enters the acquisition area of the second device. When no end tracking event sent by the second device is received before the end tracking event sent by the first device is received, the management device can determine that the target object has not left the acquisition area of the second device when it leaves the acquisition area of the first device.

In an embodiment of the present application, the management platform may store the detection events uploaded by each monitoring device, and further, when receiving the end tracking event reported by the first device, it may inquire from the stored detection events whether an end tracking event reported by the second device was received before the end tracking event reported by the first device was received.

In this way, when the event type of the received detection event is the end tracking event, the monitoring device that reported the detection event is the first device, and no end tracking event reported by the second device is received before receiving the detection event, the management device can determine that the received detection event satisfies a preset condition for the object crossing the acquisition area. Furthermore, the management platform may execute the above step S104 to determine to perform cross-device tracking picture switching.

Based on this, in Example 3, for the moving scenarios where the target object turns back and moves in the overlapping area between the acquisition areas of multiple monitoring devices, the management platform can still track the target object, ensuring that the display device can always display the tracking picture of the target object sent by the designated monitoring device.

For example, in the example of the target 1 turning back and moving in the overlapping area between the acquisition areas of multiple monitoring devices shown in FIG. 7, the target 1 first enters the acquisition area of the camera A, and then the camera A reports a start tracking event to the management platform, and the management platform determines that the received detection event satisfies a preset condition for the object crossing the acquisition area. Furthermore, it is determined to perform cross-device tracking picture switching, and at this time, it is determined that the first device is camera A. Then, if the target 1 enters the acquisition area of camera B without leaving the acquisition area of camera A, camera B will report a start tracking event to the management platform, and the management platform determines that the received detection event satisfies a preset condition for the object crossing the acquisition area. Furthermore, it is determined to perform cross-device tracking picture switching. At this time, it is determined that the first device is camera B, then the second device is camera A, and the target 1 is located in the overlapping area of camera A and camera B. After that, if the target 1 leaves the acquisition area of camera B and the target 1 does not leave the acquisition area of camera A, camera B reports an end tracking event to the management platform, and camera A does not report an end tracking event to the management platform. At this time, the first device has reported the end tracking event, and the management platform does not receive any end tracking event reported by the second device before the first device reported the end tracking event. Therefore, the management platform can determine that the received detection event satisfies a preset condition for the object crossing the acquisition area. Further, it is determined to perform the cross-device tracking picture switching, and the camera A is determined as the first device again.

Alternatively, in a specific way of embodiment 3, the method for determining picture switching provided by the above embodiment of the present application may further include the following steps:

When it is determined to perform cross-device tracking picture switching, and the event type of the received detection event is the start tracking event, the currently displayed tracking picture is switched to the tracking picture acquired by the monitoring device that reported the detection event;

When it is determined to perform the cross-device tracking picture switching, and the event type of the received detection event is the end tracking event, the currently displayed tracking picture is switched to the tracking picture acquired by the second device.

Embodiment 4: the detection event is the event information reported by the monitoring device when detecting the target object in the acquired tracking picture. The method for determining picture switching provided by the embodiment of the present application may further include the following steps:

When the monitoring device reporting the detection event is not the first device, and no detection event reported by the first device is received within a third preset duration, determining that the received detection event satisfies the preset condition for the object crossing the acquisition area.

The first device is a monitoring device that sends the currently displayed tracking picture.

Alternatively, since the tracking task sent to each monitoring device among multiple monitoring devices may include the device task identifier of the monitoring device, wherein the device task identifiers of different monitoring devices are different, and the event information of the detection event reported by the monitoring device includes its own device task identifier, the management platform can determine whether the monitoring device reporting the received detection event is the first device by determining whether the device task identifier of the monitoring device reporting the received detection event is the same as that of the first device.

It should be noted that the specific value of the third preset duration may be determined according to the requirements in practical applications and the performances of the management platform and monitoring devices in practical applications, which are not specifically limited in the embodiment of the present application.

Since the detection event is the event information reported by the monitoring device when detecting the target object in the acquired tracking picture, when a monitoring device reports the detection event, it can be indicated that the target object is present in the acquisition area of the monitoring device, wherein the target object may either start to enter the acquisition area of the monitoring device or already enter the acquisition area of the monitoring device; correspondingly, when a monitoring device no longer reports detection events, it can be indicated that the target object leaves the acquisition area of the monitoring device.

Based on this, when the management platform receives the detection event reported by a monitoring device other than the first device, the management platform can determine that the target object is located in the acquisition area of the monitoring device other than the first device. Further, when the management platform does not receive any detection event reported by the first device within the third preset duration, the management platform can determine that the target object leaves the acquisition area of the first device. Therefore, the management platform can determine that the received detection event satisfies a preset condition for the object crossing the acquisition area. Furthermore, the management platform may execute the above step S104 to determine to perform cross-device tracking picture switching.

Further, alternatively, in a specific way of Embodiment 4, the method for determining picture switching provided by the above embodiment of the present application may further include the following steps:

when determining to perform cross-device tracking picture switching, the currently displayed tracking picture is switched to the tracking picture acquired by the monitoring device that reported the detection event.

Based on this, in Embodiment 4, for the moving scenarios where the target object turns back and moves in the overlapping area of the acquisition areas of multiple monitoring devices, the management platform can still track the target object, ensuring that the display device can always display the tracking picture of the target object sent by the designated monitoring device.

For example, in the above example of the target 1 turning back and moving in the overlapping area between the acquisition areas of multiple monitoring devices as shown in FIG. 7, it is assumed that when the target 1 is located in the overlapping acquisition area of cameras A and B, the first device is camera B. Furthermore, when the target 1 leaves the acquisition area of camera B and is still located in the acquisition area of camera A, the management platform can receive the detection event reported by camera A, but does not receive any detection event reported by camera B within the third preset duration. In this way, the management platform can determine that the received detection event reported by camera A satisfies a preset condition for the object crossing the acquisition area. Furthermore, the management platform can determine to perform cross-device tracking picture switching, and switch the first device to camera A, that is, control the display device to display the video picture acquired and sent by camera A.

Embodiment 5: Event types of detection events may include start tracking events and end tracking events. The method for determining picture switching provided by the embodiment of the present application may further include the following steps:

when the event type of the received detection event is the end tracking event, and the monitoring device that reported the detection event is the first device, and the monitoring device that reported the last received start tracking event is not the first device, determining that the received detection event satisfies a preset condition for the object crossing the acquisition area;

The first device is a monitoring device that sends the currently displayed tracking picture.

Alternatively, since the tracking task sent to each of the multiple monitoring devices may include the device task identifier of the monitoring device, wherein the device task identifiers of different monitoring devices are different, and the event information of the detection event reported by the monitoring device includes its own device task identifier, the management platform can determine whether the monitoring device reporting the received detection event is the first device by determining whether the device task identifier of the monitoring device reporting the received detection event is the same as that of the first device.

Upon receiving the end tracking event sent by the first device, the management platform can determine that the target object leaves the acquisition area of the first device, and further, the management device can determine whether the monitoring device that reported the start tracking event recently received by the management device is the first device.

Since the start tracking event is the event information reported by the monitoring device when detecting that the target object enters its own acquisition area, when the management platform determines, after receiving the end tracking event sent by the first device, that the monitoring device that reported recently received the start tracking event is not the first device, it can be determined that the target object enters the acquisition area of the monitoring device that reported the last received start tracking event, so that the management platform can determine that the received detection event satisfies a preset condition for the object crossing the acquisition area. Furthermore, the management platform can determine the cross-regional picture tracking.

Alternatively, in a specific way of Embodiment 5, the method for determining picture switching provided by the above embodiment of the present application may further include the following steps:

when it is determined to perform the cross-device tracking picture switching, and the event type of the received detection event is the end tracking event, the currently displayed tracking picture is switched to the tracking picture acquired by the monitoring device that reported the last received start tracking event.

Figure 12:
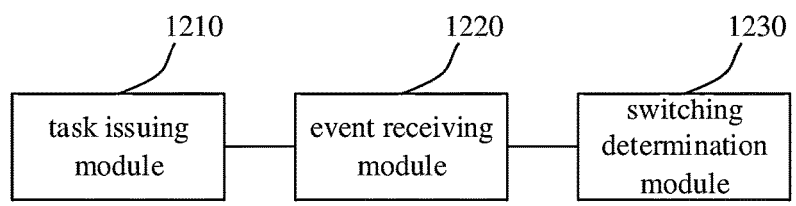
FIG. 12 is a structural schematic diagram of an apparatus for determining picture switching provided by an embodiment of the present application.

Corresponding to the above method for determining picture switching provided by the embodiment of the present application, an embodiment of the present application also provides an apparatus for determining picture switching. FIG. 12 is a structural schematic diagram of an apparatus for determining picture switching provided by the embodiment of the present application. As shown in FIG. 12, the apparatus for determining picture switching may include the following modules:

a task issuing module 1210 configured for issuing tracking tasks for a target object to designated multiple monitoring devices;

an event receiving module 1220 configured for receiving detection events reported by the monitoring devices, wherein the detection events are event information reported by the monitoring devices based on presence statuses of the target object in acquired video pictures;

a switching determination module 1230 configured for determining to perform cross-device tracking picture switching when a received detection event satisfies a preset condition for an object crossing an acquisition area; wherein, the object crossing the acquisition area means that the target object enters or leaves the acquisition area of one of the multiple monitoring devices.

It can be seen from the above that, by applying the solution provided by the embodiments of the present application, when tracking the target object, the management platform of the monitoring system can receive the detection event reported by the designated monitoring device. In this way, since the detection event reported by the monitoring device is the event information reported by the monitoring device based on the presence status of the target object in the video picture acquired by the monitoring device itself, it can be determined whether the detection event satisfies the preset condition for the object crossing the acquisition area, that is, to determine whether the target object enters or leaves the acquisition area of the monitoring device. Furthermore, when the received detection event satisfies the preset condition for the object crossing the acquisition area, the management platform can directly determine to perform cross-device tracking picture switching for the target object. Based on this, by applying the solutions provided by the embodiment of the present application, the management platform of the monitoring system can directly determine whether to perform the cross-device tracking picture switching according to the received detection events reported by the monitoring devices without a large number of complicated calculations. Therefore, it is not necessary to integrate a large amount of computing logic in the management platform, which reduces the integration difficulty of the management platform.

Alternatively, in a specific implementation, wherein event types of the detection events include a non-end tracking event and an end tracking event; wherein the non-end tracking event is event information reported by a monitoring device when detecting that the target object is in its own acquisition area; the end tracking event is event information reported by the monitoring device when detecting that the target object leaves its own acquisition area; the apparatus further includes: a first condition determination module configured for: after receiving the detection events reported by the monitoring devices, in case that an event type of a received detection event belongs to the end tracking event and a monitoring device that reported the end tracking event is a first device, determining, when a detection event with an event type belonging to the non-end tracking event is received after receiving the end tracking event, that the received detection event satisfies the preset condition for the object crossing the acquisition area; wherein the first device is a monitoring device that sends a currently displayed tracking picture.

Alternatively, in a specific implementation, the first condition determination module includes: an identifier clearing submodule configured for, after receiving the detection events reported by the monitoring devices, clearing an tracking task identifier in case that the event type of a received detection event belongs to the end tracking event and the monitoring device that reported the end tracking event is the first device; wherein, the tracking task identifier is configured for indicating a device task identifier of the monitoring device that is currently to send the tracking picture, and the tracking task identifier is the device task identifier of the first device before being cleared; a condition determination submodule, configured for determining that the received detection event satisfies the preset condition for the object crossing the acquisition area when the event type of the received detection event belongs to the non-end tracking event and the tracking task identifier is null.

Alternatively, in a specific implementation, the non-end tracking event includes a start tracking event and a continuous tracking event; wherein the start tracking event is event information reported by a monitoring device when detecting that the target object enters its own acquisition area; the continuous tracking event is event information reported by the monitoring device when detecting that the target object is in its own acquisition area after the start tracking event is reported and before the end tracking event is reported; the first condition determination module is specifically configured for: determining, when the detection event with an event type belonging to the continuous tracking event is received within a first preset duration after the end tracking event is received, that the received detection event satisfies the preset condition for the object crossing the acquisition area.

Alternatively, in a specific implementation, the non-end tracking event includes a start tracking event and a continuous tracking event; wherein the start tracking event is event information reported by a monitoring device when detecting that the target object enters its own acquisition area; the continuous tracking event is event information reported by the monitoring device when detecting that the target object is in its own acquisition area after the start tracking event is reported and before the end tracking event is reported; the condition determination submodule is specifically configured for determining that the received detection event satisfies the preset condition for the object crossing the acquisition area when the event type of the received detection event belongs to the continuous tracking event and the tracking task identifier is null; the apparatus further includes a third condition determination module, wherein the third condition determination module is configured for determining that a received detection event satisfies the preset condition for the object crossing the acquisition area when the event type of the received detection event belongs to the start tracking event.

Alternatively, in a specific implementation, the tracking task issued to each monitoring device of the multiple monitoring devices includes a device task identifier of this monitoring device, wherein different monitoring devices have different device task identifiers; the event information includes the device task identifier of a monitoring device that reported the event information.

Alternatively, in a specific implementation, the apparatus further includes a task stopping module, configured for, in case that the event type of the received detection event belongs to the end tracking event and the monitoring device that reported the end tracking event is the first device, stopping performing the tracking tasks when no detection event with an event type belonging to the non-end tracking event is received within a second preset duration after receiving the end tracking event.

Alternatively, in a specific implementation mode, the apparatus further includes: a picture switching module, configured for, when determining to perform cross-device tracking picture switching, performing switching from the currently displayed tracking picture to a video picture acquired by the monitoring device that reported a detection event belonging to the non-end tracking event; a identifier updating module, configured for updating the tracking task identifier with the device task identifier of the monitoring device that reported the detection event belonging to the non-end tracking event.

Alternatively, in a specific implementation, event types of the detection events include a start tracking event and an end tracking event; wherein the start tracking event is event information reported by a monitoring device when detecting that the target object enters its own acquisition area; the end tracking event is event information reported by the monitoring device when detecting that the target object leaves its own acquisition area; the apparatus further includes a fourth condition determination module; wherein the fourth condition determination module is configured for: after receiving the detection events reported by the monitoring devices, determining that a received detection event satisfies the preset condition for the object crossing the acquisition area when the event type of the received detection event is the start tracking event; determining that a received detection event satisfies the preset condition for the object crossing the acquisition area when the event type of the received detection event is the end tracking event, the monitoring device that reported the detection event is the first device, and no end tracking event sent by a second device is received before the detection event is received; wherein the first device is a monitoring device that sends a currently displayed tracking picture, and the second device is a monitoring device that reports a previous received start tracking event, wherein the previous received start tracking event is a last received start tracking event before receiving the start tracking event sent by the first device; or, after receiving the detection events reported by the monitoring devices, in case that the event type of a received detection event is the end tracking event, and the monitoring device that reported the detection event is a first device, and the monitoring device that reported the last received start tracking event is not the first device, determining that the received detection event satisfies the preset condition for the object crossing the acquisition area; wherein the first device is a monitoring device that sends a currently displayed tracking picture.

Alternatively, in a specific implementation, the detection event is event information reported by a monitoring device when detecting the target object in a tracking picture acquired by the monitoring device; the apparatus further includes a fifth condition determination module that is configured for: after receiving the detection events reported by the monitoring devices, when the monitoring device reporting a detection event is not a first device, and no detection event reported by the first device is received within a third preset duration, determining that the received detection event satisfies the preset condition for the object crossing the acquisition area; wherein the first device is a monitoring device that sends a currently displayed tracking picture.

Figure 13:
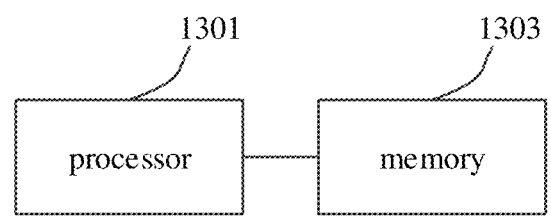
FIG. 13 is a schematic structural diagram of an electronic device provided by the embodiment of the present application.

Corresponding to the above method for determining picture switching provided by the embodiment of the present application, an embodiment of the present application also provides an electronic device, which is the management platform of the monitoring system. As shown in FIG. 13, the electronic device includes a processor 1301 and a memory 1303; the memory 1303 is configured for storing computer programs; the processor 1301 is configured to perform any of the above-mentioned methods for determining picture switching provided by the embodiments of the present application when executing the programs stored in the memory 1303.

Figure 14:
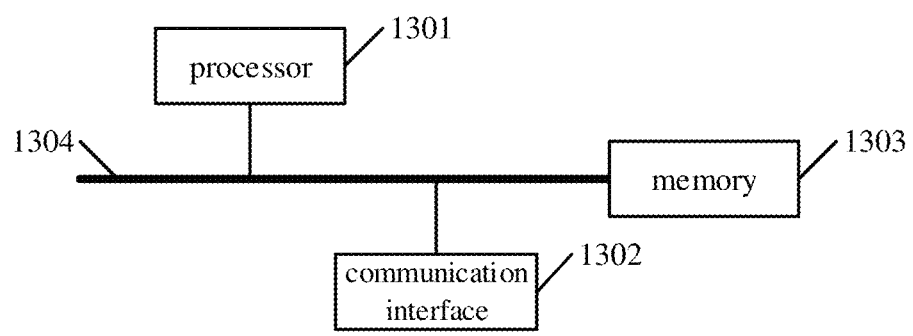
FIG. 14 is a schematic structural diagram of another electronic device provided by the embodiment of the present application.

Alternatively, in a specific implementation, as shown in FIG. 14, the electronic device further includes a communication interface 1302 and a communication bus 1304; wherein, the processor 1301, the communication interface 1302 and the memory 1303 communicate with each other via the communication bus 1304.

The communication bus mentioned by the electronic device may be a peripheral component interconnect (PCI) bus or an extended industry standard architecture (EISA) bus, etc. The communication bus may be divided into an address bus, a data bus and a control bus, and the like. For ease of presentation, only one thick line is shown in the figure, but it does not mean that there is only one bus or one type of bus.

The communication interface is configured for communications between the above electronic devices and other devices. The memory may include Random Access Memory (RAM) or Non-Volatile Memory (NVM), such as at least one disk memory. Alternatively, the memory may also be at least one storage located far away from the aforementioned processor. The above processor may be general-purpose processors, including a Central Processing Unit (CPU), a Network Processor (NP), etc., it may also be a Digital Signal Processing (DSP), an application specific integrated circuit (ASIC), a Field-Programmable Gate Array (FPGA) or other programmable logic apparatuses, discrete gate or transistor logic apparatuses, and discrete hardware components.

Corresponding to the above-mentioned method for determining picture switching provided by the embodiment of the present application, the embodiment of the present application also provides a computer readable storage medium, which, when executed by a processor, realizes the steps of any of the above-mentioned methods for determining picture switching provided by the embodiment of the present application.

Corresponding to the above-mentioned method for determining picture switching provided by the embodiment of the present application, an embodiment of the present application also provides a computer program product containing instructions which, when executed by a computer, causes the computer to execute any method for determining picture switching provided in the first aspect.

It should be noted that in this text, relational terms such as first and second are only used to distinguish one entity or operation from another entity or operation, and do not necessarily require or imply any such actual relationship or sequence between these entities or operations. Moreover, the terms "including", "comprising" or any other variation thereof are intended to cover a non-exclusive inclusion, so that a process, method, article or device that includes a series of elements includes not only those elements, but also other elements not explicitly listed, or elements inherent to such process, method, article or device. Without further limitation, an element defined by the statement "including a . . . " does not preclude the presence of additional identical element in a process, method, article or device that includes the said element.

All the embodiments in this specification are described in relevant ways, and the same and similar parts between the various embodiments may be referred to each other, and each embodiment focuses on the differences from other embodiments. In particular, for the apparatus embodiment, the electronic device embodiment, the computer readable storage medium embodiment and the computer program product embodiment, since they are basically similar to the method embodiment, the description are relatively simple, and the relevant details may refer to the partial description of the method embodiment.

The above are only preferred embodiments of the present application, and are not intended to limit the present application. Any modifications, equivalent replacements, improvements, etc. made within the spirit and principles of the present application shall be included in the scope of the present application.

What is claimed is:

1. A method for determining picture switching, comprising:
    issuing tracking tasks for a target object to designated multiple monitoring devices;
    receiving detection events reported by the monitoring devices, wherein the detection events are event information reported by the monitoring devices based on presence statuses of the target object in acquired video pictures, and when the presence statuses of the target object in acquired video pictures are different, the detection events reported by the monitoring devices are different, and event types of the detection events comprise a non-end tracking event and an end tracking event;
    determining to perform cross-device tracking picture switching when a received detection event satisfies a preset condition for an object crossing an acquisition area; wherein, the object crossing the acquisition area means that the target object enters or leaves the acquisition area of one of the multiple monitoring devices.

2. The method according to claim 1, wherein the non-end tracking event is event information reported by a monitoring device when detecting that the target object is in its own acquisition area; the end tracking event is event information reported by the monitoring device when detecting that the target object leaves its own acquisition area; wherein after receiving the detection events reported by the monitoring devices, the method further comprises:
    in case that an event type of a received detection event belongs to the end tracking event and a monitoring device that reported the end tracking event is a first device, determining, when a detection event with an event type belonging to the non-end tracking event is received after receiving the end tracking event, that the received detection event satisfies the preset condition for the object crossing the acquisition area; wherein the first device is a monitoring device that sends a currently displayed tracking picture.

3. The method according to claim 2, wherein, a step of determining, when the detection event with an event type belonging to the non-end tracking event is received after receiving the end tracking event, that the received detection event satisfies the preset condition for the object crossing the acquisition area, comprises:
    clearing a tracking task identifier in case that the event type of the received detection event belongs to the end tracking event and the monitoring device that reported the end tracking event is the first device; wherein, the tracking task identifier is configured for indicating a device task identifier of the monitoring device that is currently to send the tracking picture, and the tracking task identifier is the device task identifier of the first device before being cleared;
    determining that the received detection event satisfies the preset condition for the object crossing the acquisition area when the event type of the received detection event belongs to the non-end tracking event and the tracking task identifier is null.

4. The method according to claim 2, wherein the non-end tracking event comprises a start tracking event and a continuous tracking event; wherein the start tracking event is event information reported by a monitoring device when detecting that the target object enters its own acquisition area; the continuous tracking event is event information reported by the monitoring device when detecting that the target object is in its own acquisition area after the start tracking event is reported and before the end tracking event is reported; the step of determining, when the detection event with an event type belonging to the non-end tracking event is received after receiving the end tracking event, that the received detection event satisfies the preset condition for the object crossing the acquisition area comprises:

determining, when the detection event with an event type belonging to the continuous tracking event is received within a first preset duration after the end tracking event is received, that the received detection event satisfies the preset condition for the object crossing the acquisition area.

5. The method according to claim 3, wherein the non-end tracking event comprises a start tracking event and a continuous tracking event; wherein the start tracking event is event information reported by a monitoring device when detecting that the target object enters its own acquisition area; the continuous tracking event is event information reported by the monitoring device when detecting that the target object is in its own acquisition area after the start tracking event is reported and before the end tracking event is reported;

the step of determining that the received detection event satisfies the preset condition for the object crossing the acquisition area when the event type of the received detection event belongs to the non-end tracking event and the tracking task identifier is null comprises: determining that the received detection event satisfies the preset condition for the object crossing the acquisition area when the event type of the received detection event belongs to the continuous tracking event and the tracking task identifier is null;

after receiving the detection events reported by the monitoring devices, the method further comprises: determining that a received detection event satisfies the preset condition for the object crossing the acquisition area when the event type of the received detection event belongs to the start tracking event.

6. The method according to claim 2, wherein in case that the event type of the received detection event belongs to the end tracking event and the monitoring device that reported the end tracking event is the first device, the method further comprises:

stopping performing the tracking tasks when no detection event with an event type belonging to the non-end tracking event is received within a second preset duration after receiving the end tracking event.

7. The method according to claim 3, wherein the tracking task issued to each monitoring device of the multiple monitoring devices comprises a device task identifier of this monitoring device, wherein different monitoring devices have different device task identifiers; the event information comprises the device task identifier of a monitoring device that reported the event information.

8. The method according to claim 3, wherein the method further comprises:

when determining to perform cross-device tracking picture switching, performing switching from the currently displayed tracking picture to a video picture acquired by the monitoring device that reported a detection event belonging to the non-end tracking event;

updating the tracking task identifier with the device task identifier of the monitoring device that reported the detection event belonging to the non-end tracking event.

9. The method according to claim 1, wherein event types of the detection events comprise a start tracking event and an end tracking event; wherein the start tracking event is event information reported by a monitoring device when detecting that the target object enters its own acquisition area; the end tracking event is event information reported by the monitoring device when detecting that the target object leaves its own acquisition area;

after receiving the detection events reported by the monitoring devices, the method further comprises:

determining that a received detection event satisfies the preset condition for the object crossing the acquisition area when the event type of the received detection event is the start tracking event;

determining that a received detection event satisfies the preset condition for the object crossing the acquisition area when the event type of the received detection event is the end tracking event, the monitoring device that reported the detection event is the first device, and no end tracking event sent by a second device is received before the detection event is received;

wherein the first device is a monitoring device that sends a currently displayed tracking picture, and the second device is a monitoring device that reports a previous received start tracking event, wherein the previous received start tracking event is a last received start tracking event before receiving the start tracking event sent by the first device.

10. The method according to claim 1, wherein the detection event is event information reported by a monitoring device when detecting the target object in a tracking picture acquired by the monitoring device; after receiving the detection events reported by the monitoring devices, the method further comprises:

when the monitoring device reporting a detection event is not a first device, and no detection event reported by the first device is received within a third preset duration, determining that the received detection event satisfies the preset condition for the object crossing the acquisition area; wherein the first device is a monitoring device that sends a currently displayed tracking picture.

11. The method according to claim 1, wherein event types of the detection events comprise a start tracking event and an end tracking event; wherein the start tracking event is event information reported by a monitoring device when detecting that the target object enters its own acquisition area; the end tracking event is event information reported by the monitoring device when detecting that the target object leaves its own acquisition area; after receiving the detection events reported by the monitoring devices, the method further comprises:

in case that the event type of a received detection event is the end tracking event, and the monitoring device that reported the detection event is a first device, and the monitoring device that reported the last received start tracking event is not the first device, determining that the received detection event satisfies the preset condition for the object crossing the acquisition area; wherein the first device is a monitoring device that sends a currently displayed tracking picture.

12. An electronic device, which is a management platform of a monitoring system and comprises a processor and a memory;
  wherein the memory is configured for storing computer programs;
  the processor is configured for performing, when executing the programs stored in the memory, operations of:
  issuing tracking tasks for a target object to designated multiple monitoring devices;
  receiving detection events reported by the monitoring devices, wherein the detection events are event information reported by the monitoring devices based on presence statuses of the target object in acquired video pictures, and when the presence statuses of the target object in acquired video pictures are different, the detection events reported by the monitoring devices are different, and event types of the detection events comprise a non-end tracking event and an end tracking event;
  determining to perform cross-device tracking picture switching when a received detection event satisfies a preset condition for an object crossing an acquisition area; wherein, the object crossing the acquisition area means that the target object enters or leaves the acquisition area of one of the multiple monitoring devices.

13. A non-transitory computer-readable storage medium in which computer programs are stored, wherein the computer programs, when executed by a processor, cause the processor to perform the method of claim 1.

14. The electronic device according to claim 12, wherein the non-end tracking event is event information reported by a monitoring device when detecting that the target object is in its own acquisition area; the end tracking event is event information reported by the monitoring device when detecting that the target object leaves its own acquisition area; wherein after receiving the detection events reported by the monitoring devices, the processor is further configured for performing:
  in case that an event type of a received detection event belongs to the end tracking event and a monitoring device that reported the end tracking event is a first device, determining, when a detection event with an event type belonging to the non-end tracking event is received after receiving the end tracking event, that the received detection event satisfies the preset condition for the object crossing the acquisition area; wherein the first device is a monitoring device that sends a currently displayed tracking picture.

15. The electronic device according to claim 14, wherein, the processor is further configured for performing:
  clearing a tracking task identifier in case that the event type of the received detection event belongs to the end tracking event and the monitoring device that reported the end tracking event is the first device; wherein, the tracking task identifier is configured for indicating a device task identifier of the monitoring device that is currently to send the tracking picture, and the tracking task identifier is the device task identifier of the first device before being cleared;
  determining that the received detection event satisfies the preset condition for the object crossing the acquisition area when the event type of the received detection event belongs to the non-end tracking event and the tracking task identifier is null.

16. The electronic device according to claim 14, wherein the non-end tracking event comprises a start tracking event and a continuous tracking event; wherein the start tracking event is event information reported by a monitoring device when detecting that the target object enters its own acquisition area; the continuous tracking event is event information reported by the monitoring device when detecting that the target object is in its own acquisition area after the start tracking event is reported and before the end tracking event is reported; the processor is further configured for performing:
  determining, when the detection event with an event type belonging to the continuous tracking event is received within a first preset duration after the end tracking event is received, that the received detection event satisfies the preset condition for the object crossing the acquisition area.

17. The electronic device according to claim 15, wherein the non-end tracking event comprises a start tracking event and a continuous tracking event; wherein the start tracking event is event information reported by a monitoring device when detecting that the target object enters its own acquisition area; the continuous tracking event is event information reported by the monitoring device when detecting that the target object is in its own acquisition area after the start tracking event is reported and before the end tracking event is reported;
  the processor is further configured for performing: determining that the received detection event satisfies the preset condition for the object crossing the acquisition area when the event type of the received detection event belongs to the continuous tracking event and the tracking task identifier is null;
  after receiving the detection events reported by the monitoring devices, the processor is further configured for performing: determining that a received detection event satisfies the preset condition for the object crossing the acquisition area when the event type of the received detection event belongs to the start tracking event,
  or wherein, the tracking task issued to each monitoring device of the multiple monitoring devices comprises a device task identifier of this monitoring device, wherein different monitoring devices have different device task identifiers; the event information comprises the device task identifier of a monitoring device that reported the event information;
  or the processor is further configured for performing:
  when determining to perform cross-device tracking picture switching, performing switching from the currently displayed tracking picture to a video picture acquired by the monitoring device that reported a detection event belonging to the non-end tracking event;
  updating the tracking task identifier with the device task identifier of the monitoring device that reported the detection event belonging to the non-end tracking event.

18. The electronic device according to claim 14, wherein in case that the event type of the received detection event belongs to the end tracking event and the monitoring device that reported the end tracking event is the first device, the processor is further configured for performing:
  stopping performing the tracking tasks when no detection event with an event type belonging to the non-end tracking event is received within a second preset duration after receiving the end tracking event.

19. The electronic device according to claim 12, wherein event types of the detection events comprise a start tracking event and an end tracking event; wherein the start tracking event is event information reported by a monitoring device when detecting that the target object enters its own acquisition area; the end tracking event is event information reported by the monitoring device when detecting that the target object leaves its own acquisition area;

after receiving the detection events reported by the monitoring devices, the processor is further configured for performing:

determining that a received detection event satisfies the preset condition for the object crossing the acquisition area when the event type of the received detection event is the start tracking event;

determining that a received detection event satisfies the preset condition for the object crossing the acquisition area when the event type of the received detection event is the end tracking event, the monitoring device that reported the detection event is the first device, and no end tracking event sent by a second device is received before the detection event is received;

wherein the first device is a monitoring device that sends a currently displayed tracking picture, and the second device is a monitoring device that reports a previous received start tracking event, wherein the previous received start tracking event is a last received start tracking event before receiving the start tracking event sent by the first device, or wherein the detection event is event information reported by a monitoring device when detecting the target object in a tracking picture acquired by the monitoring device; after receiving the detection events reported by the monitoring devices, the processor is further configured for performing:

when the monitoring device reporting a detection event is not a first device, and no detection event reported by the first device is received within a third preset duration, determining that the received detection event satisfies the preset condition for the object crossing the acquisition area; wherein the first device is a monitoring device that sends a currently displayed tracking picture.

20. The electronic device according to claim 12, wherein event types of the detection events comprise a start tracking event and an end tracking event; wherein the start tracking event is event information reported by a monitoring device when detecting that the target object enters its own acquisition area; the end tracking event is event information reported by the monitoring device when detecting that the target object leaves its own acquisition area; after receiving the detection events reported by the monitoring devices, the processor is further configured for performing:

in case that the event type of a received detection event is the end tracking event, and the monitoring device that reported the detection event is a first device, and the monitoring device that reported the last received start tracking event is not the first device, determining that the received detection event satisfies the preset condition for the object crossing the acquisition area; wherein the first device is a monitoring device that sends a currently displayed tracking picture.

\* \* \* \* \*